US010305560B2

(12) United States Patent
Adachi et al.

(10) Patent No.: US 10,305,560 B2
(45) Date of Patent: May 28, 2019

(54) TRANSMISSION DEVICE, RECEPTION DEVICE, TRANSMISSION METHOD, AND RECEPTION METHOD

(71) Applicant: Panasonic Intellectual Property Management Co., Ltd., Osaka (JP)

(72) Inventors: Naoki Adachi, Kanagawa (JP); Tomohiro Kimura, Osaka (JP); Takayuki Sotoyama, Kanagawa (JP); Kazuaki Takahashi, Tokyo (JP); Naganori Shirakata, Kanagawa (JP); Koji Takinami, Kanagawa (JP); Takenori Sakamoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/070,123

(22) PCT Filed: Jun. 14, 2016

(86) PCT No.: PCT/JP2016/002862
§ 371 (c)(1),
(2) Date: Jul. 13, 2018

(87) PCT Pub. No.: WO2017/125969
PCT Pub. Date: Jul. 27, 2017

(65) Prior Publication Data
US 2019/0028165 A1      Jan. 24, 2019

(30) Foreign Application Priority Data

Jan. 20, 2016   (JP) ................................ 2016-008878

(51) Int. Cl.
*H04L 1/02*    (2006.01)
*H04B 7/06*    (2006.01)
(Continued)

(52) U.S. Cl.
CPC ............. *H04B 7/0615* (2013.01); *H01Q 3/24* (2013.01); *H01Q 3/36* (2013.01); *H01Q 19/17* (2013.01);
(Continued)

(58) Field of Classification Search
CPC  H04B 7/0452; H04B 7/0617; H04B 10/2581; H04B 10/25752; H04B 7/0697;
(Continued)

(56) References Cited

U.S. PATENT DOCUMENTS

2015/0188660 A1\*  7/2015  Byun ................. H04B 10/2581
                                                                398/44
2016/0028163 A1   1/2016  Li et al.
(Continued)

FOREIGN PATENT DOCUMENTS

JP    2015-207799 A    11/2015
WO    2012/084039 A1    6/2012
(Continued)

OTHER PUBLICATIONS

The Extended European Search Report dated Dec. 3, 2018 for the related European Patent Application No. 16886215.9.
(Continued)

*Primary Examiner* — Khai Tran
(74) *Attorney, Agent, or Firm* — Seed IP Law Group LLP

(57) ABSTRACT

A transmission device transmits multiplexed signals obtained by multiplexing signals of N systems corresponding to N Orbital Angular Momentum (OAM) propagation modes. The transmission device includes: an array antenna that includes M antenna elements disposed in a lattice on a plane when viewed from the plane; and a transmitter that multiplies signals obtained by branching each of the signals of N systems into M signals by weighting coefficients of phase shift angles based on angles of the respective M
(Continued)

antenna elements with respect to a reference axis passing through a reference point viewed from the reference point on the plane according to the OAM propagation modes, multiplexes the signals of N systems multiplied by the weighting coefficients of the phase shift angles, and transmits signals obtained by the multiplexing from the M antenna elements. M and N are integers equal to or larger than 2.

12 Claims, 17 Drawing Sheets

(51) Int. Cl.
| | |
|---|---|
| *H01Q 19/17* | (2006.01) |
| *H04J 11/00* | (2006.01) |
| *H01Q 3/36* | (2006.01) |
| *H01Q 21/06* | (2006.01) |
| *H04B 7/08* | (2006.01) |
| *H01Q 3/24* | (2006.01) |
| *H01Q 25/00* | (2006.01) |
| *H01Q 19/19* | (2006.01) |
| *H01Q 21/20* | (2006.01) |

(52) U.S. Cl.
CPC ........... *H01Q 19/19* (2013.01); *H01Q 21/061* (2013.01); *H01Q 25/007* (2013.01); *H04B 7/0617* (2013.01); *H04B 7/086* (2013.01); *H04J 11/00* (2013.01); *H01Q 21/20* (2013.01)

(58) Field of Classification Search
CPC ...... H04L 9/3093; H04L 27/04; H04W 16/28; H04J 14/00; H04J 14/04; H01Q 21/29
USPC ........ 375/267, 148, 260, 261, 299; 370/343, 370/477
See application file for complete search history.

(56) References Cited

U.S. PATENT DOCUMENTS

2016/0204896 A1* 7/2016 Yu .................. H04J 14/086
398/65
2016/0308280 A1* 10/2016 Shimizu ............... H04B 7/0617
2017/0062910 A1 3/2017 Iida

FOREIGN PATENT DOCUMENTS

WO 2014/199451 A 12/2014
WO 2015/159808 A 10/2015

OTHER PUBLICATIONS

Palacin Baptiste et al: "An 8×8 Butler matrix for generation of waves carrying Orbital Angular Momentum (OAM)",The 8th European Conference on Antennas and Propagation (EUCAP 2014), European Association on Antennas and Propagation, Apr. 6, 2014 (Apr. 6, 2014), pp. 2814-2818, XP032642836.

* cited by examiner

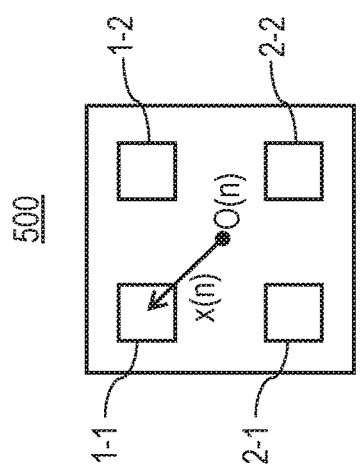

TRANSMISSION DEVICE, RECEPTION DEVICE, TRANSMISSION METHOD, AND RECEPTION METHOD

This application is a U.S. national stage application of the PCT International Application No. PCT/JP2016/002862 filed on Jun. 14, 2016, which claims the benefit of foreign priority of Japanese patent application 2016-008878 filed on Jan. 20, 2016, the contents all of which are incorporated herein by reference.

TECHNICAL FIELD

The present disclosure relates to a transmission device, a reception device, a transmission method, and a reception method.

BACKGROUND ART

Recently, electromagnetic waves, which have Orbital Angular Momentum (OAM), are used in wireless communication in which signals are transmitted and received using the electromagnetic waves.

In the electromagnetic waves having the OAM, a plurality of modes (hereinafter, described as OAM propagation modes) exist according to difference in phase variations with respect to an azimuth angle. The electromagnetic waves having different OAM propagation modes are orthogonal to each other.

For example, PTL 1 discloses a technology in which a plurality of transmission parabola antennas transmit electromagnetic waves, which respectively have different OAM propagation modes, and a plurality of reception parabola antennas, which form pairs with the plurality of transmission parabola antennas, receive the electromagnetic waves which are transmitted from the relevant transmission parabola antennas. According to the technology, it is possible to transmit and receive the electromagnetic waves, which have one OAM propagation mode, between a pair of the transmission parabola antenna and the reception parabola antenna, and thus it is possible to realize high communication capacity by multiplexing signals over a plurality of orthogonal channels.

In addition, PTL 2 and PTL 3 disclose technologies for transmitting the electromagnetic waves having different OAM propagation modes using an array antenna disposed in a circle. According to the technologies, it is possible to transmit and receive the electromagnetic waves having the plurality of OAM propagation modes, and thus it is possible to realize the high communication capacity by multiplexing the signals over the plurality of orthogonal channels.

CITATION LIST

Patent Literature

PTL 1: International Publication No. 2014/199451
PTL 2: International Publication No. 2015/159808
PTL 3: Japanese Patent Unexamined Publication No. 2015-207799

SUMMARY OF THE INVENTION

However, in the technologies disclosed in PTL 1, PTL 2, and PTL 3, a dedicated antenna, which transmits and receives wireless signals of the electromagnetic waves having the OAM propagation modes, is necessary.

Therefore, for example, in an existing array antenna which is used for massive MIMO and in which antenna elements are disposed in a lattice, it is not possible to perform communication using wireless signals having the plurality of OAM propagation modes.

The present disclosure is made to solve the above problems, and an object of the present disclosure is to provide a transmission device, a reception device, a transmission method, and a reception method in which it is possible to multiplex signals over a plurality of orthogonal channels using wireless signals having a plurality of OAM propagation modes in an array antenna in which antenna elements are disposed in a lattice.

According to the present disclosure, there is provided a transmission device that transmits multiplexed signals, the multiplexed signals being obtained by multiplexing signals of N systems corresponding to N Orbital Angular Momentum (OAM) propagation modes, N being an integer equal to or larger than 2, the transmission device including: an array antenna that includes M antenna elements disposed in a lattice on a plane when viewed from the plane, M being an integer equal to or larger than 2; and a transmitter that multiplies signals obtained by branching each of the signals of N systems into M signals by weighting coefficients of phase shift angles based on angles of the respective M antenna elements with respect to a reference axis passing through a reference point viewed from the reference point on the plane according to the OAM propagation modes, multiplexes the signals of N systems multiplied by the weighting coefficients of the phase shift angles, and transmits signals obtained by the multiplexing from the M antenna elements.

According to the present disclosure, there is provided a reception device that receives multiplexed signals, the multiplexed signals being obtained by multiplexing signals of N systems corresponding to N Orbital Angular Momentum (OAM) propagation modes, N being an integer equal to or larger than 2, the reception device including: an array antenna that includes M antenna elements disposed in a lattice on a plane when viewed from the plane, M being an integer equal to or larger than 2; and a receiver that multiplies the multiplexed signals by weighting coefficients of phase shift angles based on angles of the respective M antenna elements with respect to a reference axis passing through a reference point viewed from the reference point on the plane according to the OAM propagation modes, and divides the multiplexed signals into N systems of reception signals.

According to the present disclosure, there is provided a transmission method for transmitting multiplexed signals using an array antenna including M antenna elements disposed in a lattice on a plane when viewed from the plane, the multiplexed signals being obtained by multiplexing signals of N systems corresponding to N Orbital Angular Momentum (OAM) propagation modes, M being an integer equal to or larger than 2, N being an integer equal to or larger than 2, the transmission method including: multiplying signals obtained by branching each of the signals of N systems into M signals by weighting coefficients of phase shift angles based on angles of the respective M antenna elements with respect to a reference axis passing through a reference point viewed from the reference point on the plane according to the OAM propagation modes; multiplexing the signals of N systems multiplied by the weighting coefficients of the phase shift angles; and transmitting signals obtained by the multiplexing from the M antenna elements.

According to the present disclosure, there is provided a reception method for receiving multiplexed signals using an array antenna including M antenna elements disposed in a lattice on a plane when viewed from the plane, the multiplexed signals being obtained by multiplexing signals of N systems corresponding to N Orbital Angular Momentum (OAM) propagation modes, M being an integer equal to or larger than 2, N being an integer equal to or larger than 2, the reception method including: receiving the multiplexed signals from the M antenna elements; multiplying the received multiplexed signals by weighting coefficients of phase shift angles based on angles of the respective M antenna elements with respect to a reference axis passing through a reference point viewed from the reference point on the plane according to the OAM propagation modes; and dividing the multiplexed signals into N systems of reception signals.

According to the present disclosure, it is possible to multiplex the signals over the plurality of orthogonal channels using the wireless signals having the plurality of OAM propagation modes in the array antenna in which the antenna elements are disposed in a lattice.

BRIEF DESCRIPTION OF DRAWINGS

FIG. 7A is a diagram illustrating an example of a 2×2 array antenna disposed in square.

FIG. 7B is a diagram illustrating the OAM phase shift in the 2×2 array antenna disposed in square.

DESCRIPTION OF EMBODIMENT

An exemplary embodiment of the present disclosure will be described in detail with reference to the accompanying drawings. Meanwhile, each exemplary embodiment, which is described below, is only an example and the present disclosure is not limited to the exemplary embodiment.

Exemplary Embodiment

Figure 1:
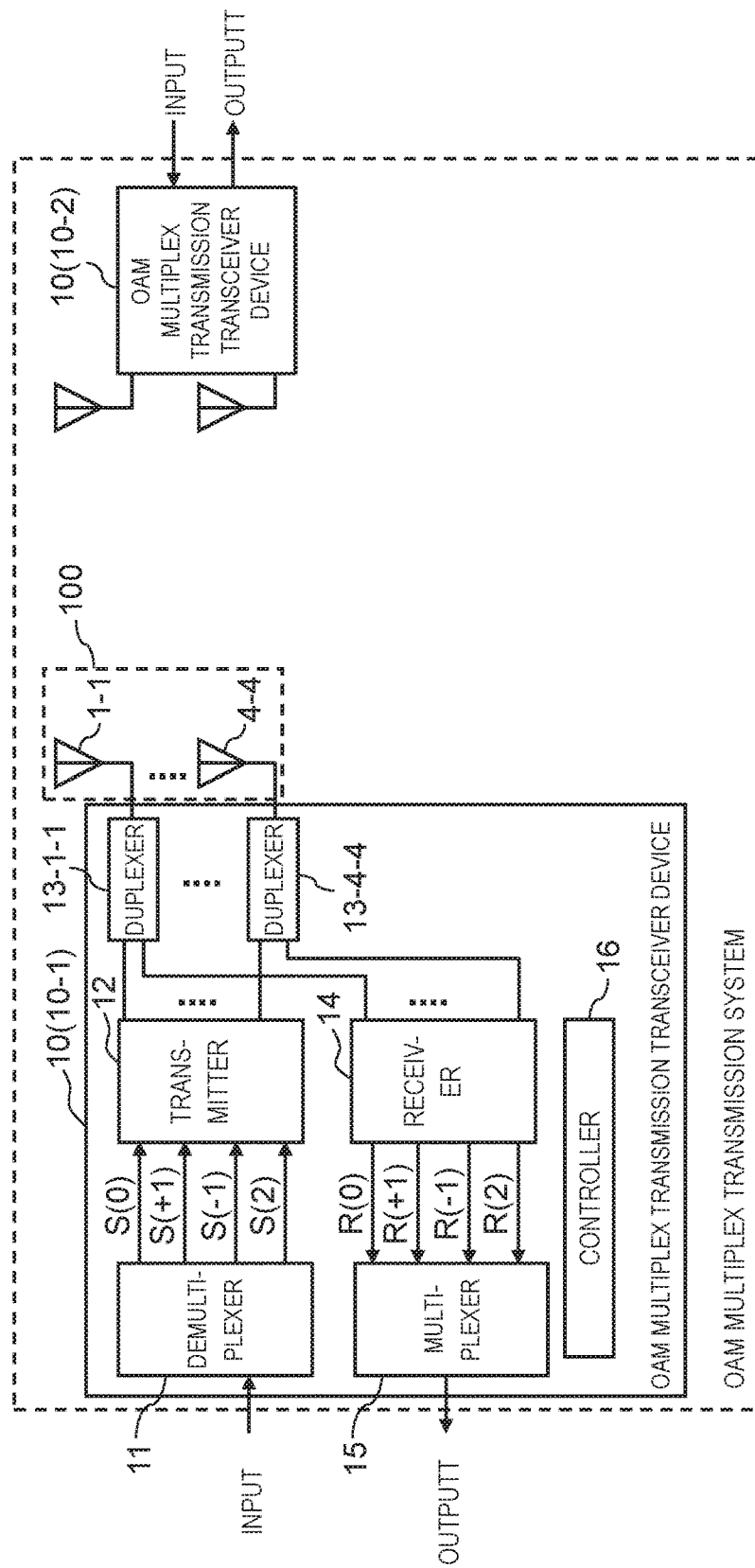
FIG. 1 is a diagram illustrating an example of an OAM multiplex transmission system according to an exemplary embodiment of the present disclosure.

FIG. 1 is a diagram illustrating an example of an OAM multiplex transmission system according to an exemplary embodiment. The OAM multiplex transmission system according to the exemplary embodiment is a system which performs multiplex in four, that is, 0-order, +1-order, −1-order, and 2-order OAM propagation modes. As the 2-order OAM propagation mode, any one of the −2-order and the +2-order OAM propagation modes or an OAM propagation mode, in which the −2-order and the +2-order OAM propagation modes are mixed, is used. The OAM multiplex transmission system includes OAM multiplex transmission transceiver device 10-1 and OAM multiplex transmission transceiver device 10-2. OAM multiplex transmission transceiver device 10-1 and OAM multiplex transmission transceiver device 10-2 have the same configurations, and perform transmission and reception with each other one-to-one. Hereinafter, the configurations of OAM multiplex transmission transceiver device 10-1 and OAM multiplex transmission device 10-2 will be described as OAM multiplex transmission transceiver device 10.

OAM multiplex transmission transceiver device 10 includes array antenna 100, demultiplexer 11, transmitter 12, duplexer 13 (13-1-1 to 13-4-4), receiver 14, multiplexer 15, and controller 16.

Figure 2:
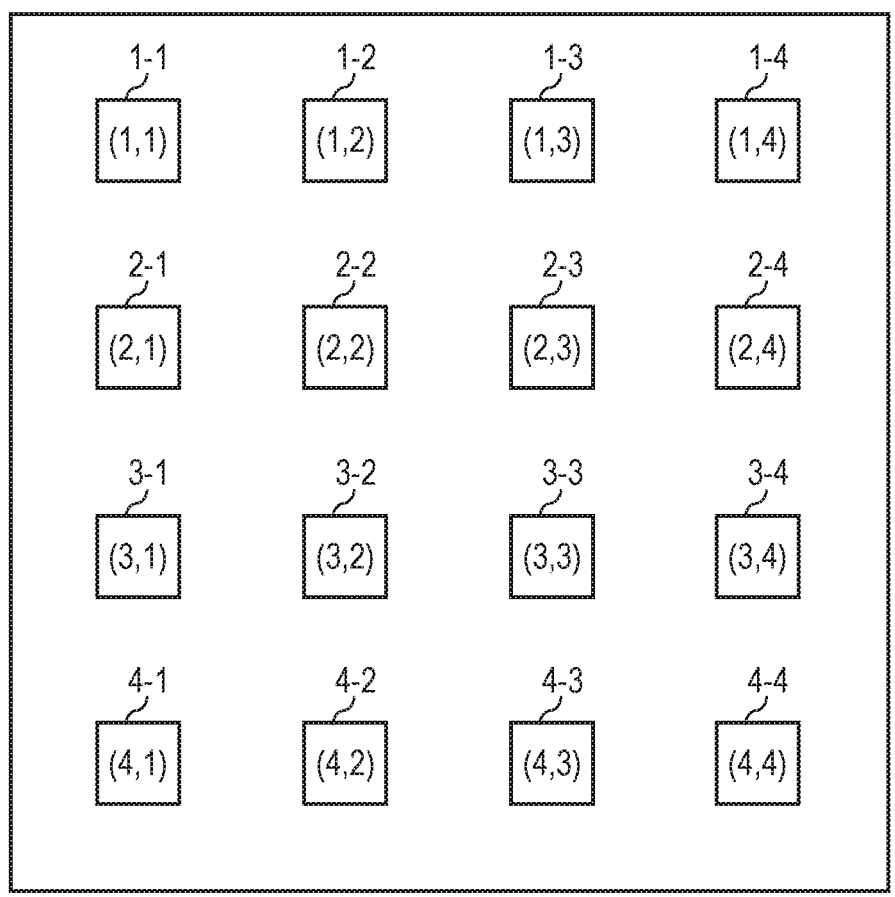
FIG. 2 is a diagram illustrating an example of a configuration of an array antenna.

Array antenna 100 has a configuration in which a plurality of antenna elements are disposed in a lattice on a plane. FIG. 2 is a diagram illustrating an example of a configuration of array antenna 100.

Array antenna 100 illustrated in FIG. 2 is a 4×4 phased array disposed in square, that is, 16 antenna elements in which four elements are disposed in a horizontal direction and four elements are disposed in a vertical direction. Hereinafter, the respective 16 antenna elements are described as antenna elements 1-1 to 4-4 according to positions illustrated in FIG. 2.

Returning to the description with reference to FIG. 1, demultiplexer 11 divides an input signal into four systems of signals, and outputs four systems of signals S(0), S(+1), S(−1), and S(2) to transmitter 12.

Transmitter 12 performs a transmission process, such as weighting of directivity control, weighting according to the OAM propagation mode, up-conversion into a wireless frequency band, or amplification, on respective four systems of signals S(0), S(+1), S(−1), and S(2), and outputs a signal, on which the transmission process is performed, to duplexers 13-1-1 to 13-4-4. A detailed configuration of transmitter 12 will be described later.

Duplexers 13-1-1 to 13-4-4 are connected to relevant antenna elements 1-1 to 4-4, respectively. That is, duplexer 13-$i$-$j$ (i and j are any one of integers ranging from 1 to 4) is connected to antenna element i-j. Duplexer 13-$i$-$j$ is provided to share antenna element i-j in transmission and reception. Duplexer 13-$i$-$j$ outputs the signal, which is output from transmitter 12, to antenna element i-j. In addition, duplexer 13-$i$-$j$ outputs the signal, which is received by antenna element i-j, to receiver 14.

Receiver 14 performs a reception process, such as the amplification, the down-conversion into a baseband, the weighting according to the OAM propagation mode, or the weighting of the directivity control, on signals which are output from duplexers 13-1-1 to 13-4-4, and outputs signals R(0), R(+1), R(−1), and R(2), on which the reception process is performed, to multiplexer 15. A detailed configuration of receiver 14 will be described later.

Multiplexer 15 gathers the four systems of reception signals, which are output from receiver 14, into one signal, and outputs the one output signal.

Controller 16 controls demultiplexer 11, transmitter 12, duplexer 13 (13-1-1 to 13-4-4), receiver 14, and multiplexer 15. Meanwhile, although an example in which the input signal and the output signal correspond to one system is illustrated, a configuration, in which four systems of signals are transmitted and received without using demultiplexer 11 and multiplexer 15, may be provided.

Figure 3:
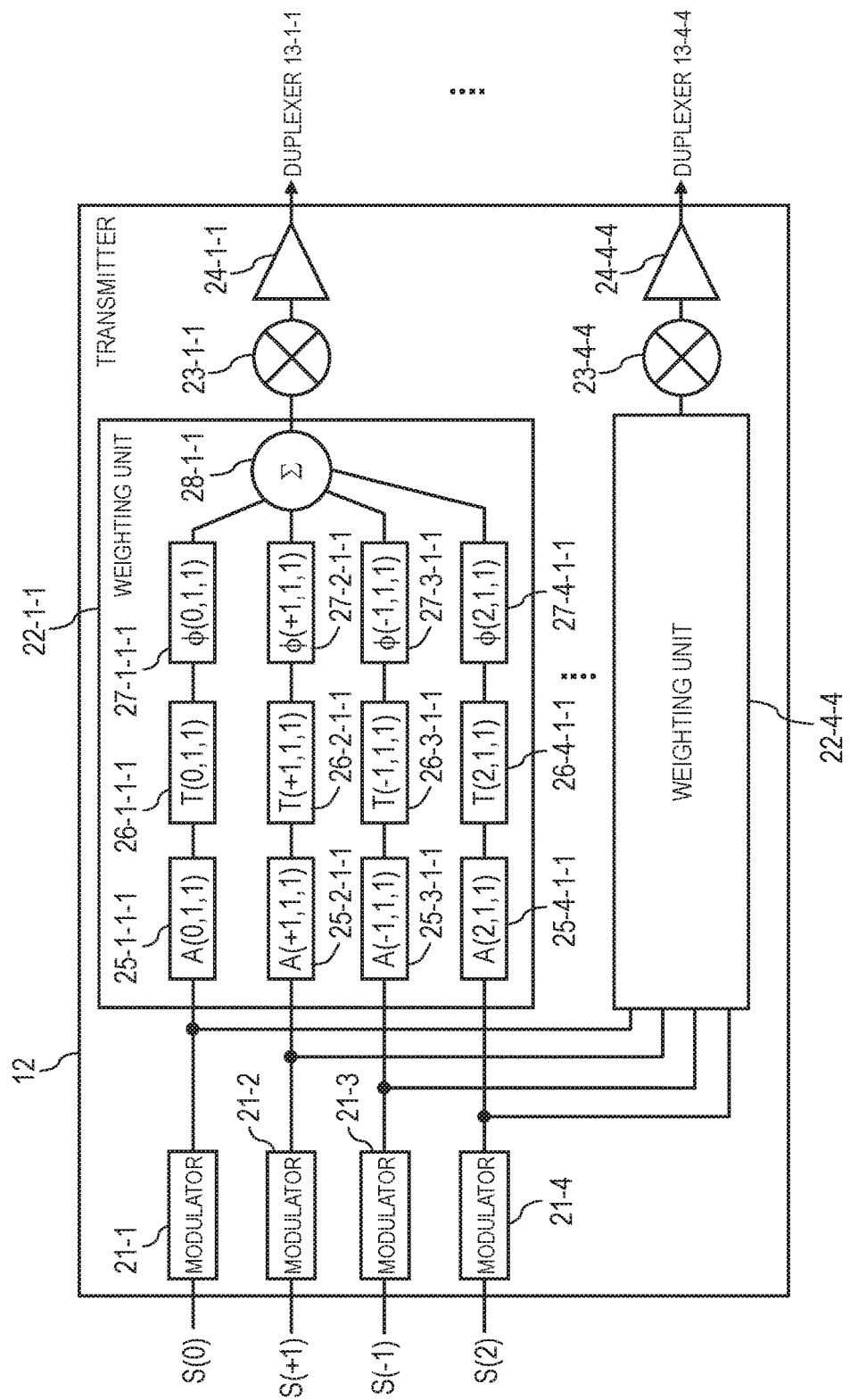
FIG. 3 is a block diagram illustrating a configuration of a transmitter according to the exemplary embodiment of the present disclosure.

Subsequently, the configuration of transmitter 12 will be described. FIG. 3 is a block diagram illustrating transmitter 12 according to the exemplary embodiment. Transmitter 12 includes modulators 21-1 to 21-4, weighting units 22-1-1 to 22-4-4, mixers 23-1-1 to 23-4-4, and amplifiers 24-1-1 to 24-4-4.

Modulators 21-1 to 21-4 respectively correspond to four OAM propagation modes, that is, 0-order, +1-order, −1-order, and 2-order OAM propagation modes. Weighting unit 22-$i$-$j$, mixer 23-$i$-$j$, and amplifier 24-$i$-$j$ correspond to antenna element i-j. That is, transmitter 12 includes modulators 21, the number of which is equal to the number of OAM propagation modes, weighting units 22, mixers 23, and amplifiers 24, the numbers of which are equal to the number of antenna elements.

Modulator 21-1 performs a predetermined modulation process on signal S(0) which is output from demultiplexer 11, and outputs signal S(0), on which the modulation process is performed, to weighting units 22-1 to 22-4-4. Modulator 21-2 performs the predetermined modulation process on signal S(+1) which is output from demultiplexer 11, and outputs signal S(+1), on which the modulation process is performed, to weighting units 22-1 to 22-4-4. Modulator 21-3 performs the predetermined modulation process on signal S(−1) which is output from demultiplexer 11, and outputs signal S(−1), on which the modulation process is performed, to weighting units 22-1 to 22-4-4. Modulator 21-4 performs the predetermined modulation process on signal S(2) which is output from demultiplexer 11, and outputs signal S(2), on which the modulation process is performed, to weighting units 22-1 to 22-4-4. Meanwhile, the modulation process, which is performed in each modulator 21, is performed under a control of controller 16.

Weighting units 22-1-1 to 22-4-4 perform the weighting of the directivity control and the weighting according to the OAM propagation mode on the signals which are output from modulators 21-1 to 21-4. Weighting units 22-1-1 to 22-4-4 have the same configuration. Hereinafter, the configuration of weighting unit 22-1-1 will be described.

Weighting unit 22-1-1 includes complex amplitude weighting units 25-1-1-1, 25-2-1-1, 25-3-1-1, and 25-4-1-1, directivity control phase shift weighting units 26-1-1-1, 26-2-1-1, 26-3-1-1, and 26-4-1-1, OAM phase shift weighting units 27-1-1-1, 27-2-1-1, 27-3-1-1, and 27-4-1-1, and adder 28-1-1.

Complex amplitude weighting unit 25-1-1-1, directivity control phase shift weighting unit 26-1-1-1, and OAM phase shift weighting unit 27-1-1-1 correspond to the 0-order OAM propagation mode. In the same manner, complex amplitude weighting unit 25-2-1-1, directivity control phase shift weighting unit 26-2-1-1, and OAM phase shift weighting unit 27-2-1-1 correspond to the +1-order OAM propagation mode, complex amplitude weighting unit 25-3-1-1, directivity control phase shift weighting unit 26-3-1-1, and OAM phase shift weighting unit 27-3-1-1 correspond to the −1-order OAM propagation mode, and complex amplitude weighting unit 25-4-1-1, directivity control phase shift weighting unit 26-4-1-1, and OAM phase shift weighting unit 27-4-1-1 correspond to the 2-order OAM propagation mode.

Complex amplitude weighting unit 25-1-1-1 applies weighting by multiplying the signal, which is output from modulator 21-1, by a weighting coefficient of complex amplitude A(0, 1, 1). In the same manner, complex amplitude weighting unit 25-2-1-1 applies weighting by multiplying the signal, which is output from modulator 21-2, by a weighting coefficient of complex amplitude A(+1, 1, 1). Complex amplitude weighting unit 25-3-1-1 applies weighting by multiplying the signal, which is output from modulator 21-3, by a weighting coefficient of complex amplitude A(−1, 1, 1). Complex amplitude weighting unit 25-4-1-1 applies weighting by multiplying the signal, which is output from modulator 21-4, by a weighting coefficient of complex amplitude A(2, 1, 1). Complex amplitude A(n, i, j) indicates complex amplitude of the directivity control with respect to a transmission signal of an n-order OAM propagation mode in antenna element i-j. In the exemplary embodiment, four OAM propagation modes, that is, 0-order, +1-order, −1-order, and 2-order OAM propagation modes are used. Therefore, n is any one of values among 0, +1, −1, and 2.

Directivity control phase shift weighting unit 26-1-1-1 applies weighting by multiplying a signal, which is output from complex amplitude weighting unit 25-1-1-1, by a weighting coefficient of directivity control phase shift T(0, 1, 1). In the same manner, directivity control phase shift weighting unit 26-2-1-1 applies weighting by multiplying a signal, which is output from complex amplitude weighting unit 25-2-1-1, by a weighting coefficient of directivity control phase shift T(+1, 1, 1). Directivity control phase shift weighting unit 26-3-1-1 applies weighting by multiplying a signal, which is output from complex amplitude weighting unit 25-3-1-1, by a weighting coefficient of directivity control phase shift T(−1, 1, 1). Directivity control phase shift weighting unit 26-4-1-1 applies weighting by multiplying a signal, which is output from complex amplitude weighting unit 25-4-1-1, by a weighting coefficient of directivity control phase shift T(2, 1, 1). Directivity control phase shift T(n, i, j) indicates directivity control phase shift with respect to the transmission signal of the n-order OAM propagation mode in antenna element i-j.

Complex amplitude A(n, i, j) and directivity control phase shift T(n, i, j) are determined based on a directivity direction of array antenna 100 and an antenna element interval. Since a method for calculating complex amplitude A(n, i, j) and directivity control phase shift T(n, i, j) in array antenna 100, in which the antenna elements are disposed in a lattice, is a well-known technology, the description thereof is omitted.

OAM phase shift weighting unit 27-1-1-1 applies weighting by multiplying a signal, which is output from directivity control phase shift weighting unit 26-1-1-1, by a weighting coefficient of OAM phase shift $\phi(0, 1, 1)$. In the same manner, OAM phase shift weighting unit 27-2-1-1 applies weighting by multiplying a signal, which is output from directivity control phase shift weighting unit 26-2-1-1, by a weighting coefficient of OAM phase shift $\phi(+1, 1, 1)$. OAM phase shift weighting unit 27-3-1-1 applies weighting by multiplying a signal, which is output from directivity control phase shift weighting unit 26-3-1-1, by a weighting coefficient of OAM phase shift $\phi(-1, 1, 1)$. OAM phase shift weighting unit 27-4-1-1 applies weighting by multiplying a signal, which is output from directivity control phase shift weighting unit 26-4-1-1, by a weighting coefficient of OAM phase shift $\phi(2, 1, 1)$. OAM phase shift $\phi(n, i, j)$ indicates the OAM phase shift with respect to the transmission signal of the n-order OAM propagation mode in antenna element i-j. A method for determining the OAM phase shift will be described later.

Adder 28-1-1 composes signals, which are respectively output from OAM phase shift weighting units 27-1-1-1 to 27-4-1-1, in the respective OAM propagation modes, and outputs a composed signal to mixer 23-1-1.

The same process as in weighting unit 22-1-1 is performed in each weighting unit 22-i-j.

In a case where modulation signals, which are acquired after modulators 21-1 to 21-4 respectively modulate S(0), S(+1), S(−1), and S(2), are set to S'(0), S'(+1), S'(−1), and S'(2), signal S''(i, j) which is output from weighting unit 22-i-j is expressed as in the following Equation (1).

$$S''(i, j) = \sum_n S'(n) \cdot A(n, i, j) \cdot \exp(J(T(n, i, j) + \Phi(n, i, j))) \quad (1)$$

Where, J indicates an imaginary unit and n has a value of 0, +1, −1, or 2.

Mixer 23-i-j up-converts a signal, which is output from relevant weighting unit 22-i-j, into a carrier frequency band.

Amplifier 24-i-j amplifies electricity of a signal, which is output from mixer 23-i-j, and outputs a signal, the electricity of which is amplified, to amplified duplexer 13-i-j.

Figure 4:
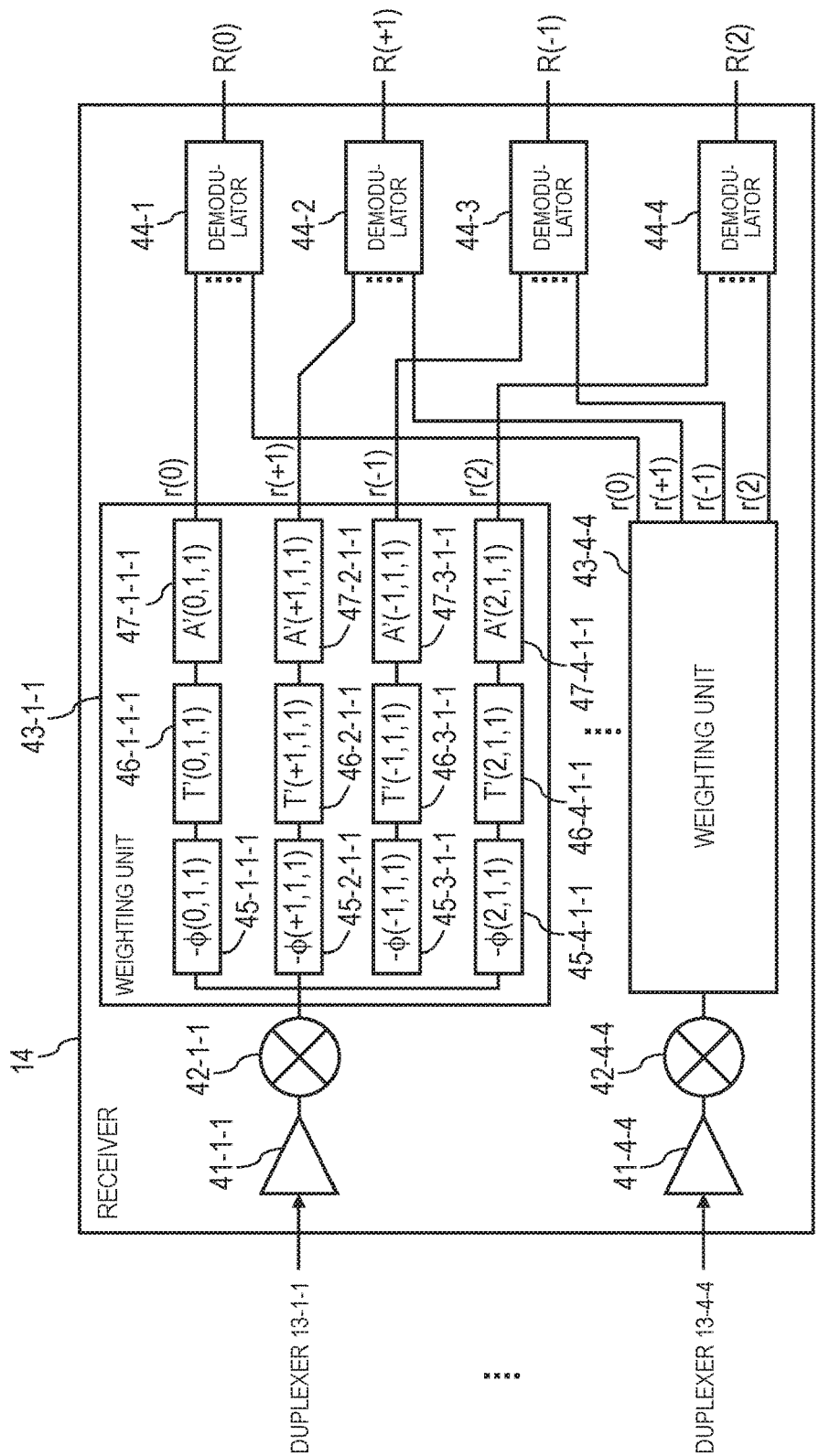
FIG. 4 is a block diagram illustrating a configuration of a receiver according to the exemplary embodiment of the present disclosure.

Subsequently, the configuration of receiver 14 will be described. FIG. 4 is a block diagram illustrating the configuration of receiver 14 according to the exemplary embodiment. Receiver 14 includes amplifiers 41-1-1 to 41-4-4, mixers 42-1-1 to 42-4-4, weighting units 43-1-1 to 43-4-4, and demodulators 44-1 to 44-4.

Amplifier 41-i-j, mixer 42-i-j, and weighting unit 43-i-j correspond to antenna element i-j. Demodulators 44-1 to 44-4 respectively correspond to the four OAM propagation modes, that is, 0-order, +1-order, −1-order, and 2-order OAM propagation modes.

Amplifier 41-i-j amplifies electricity of the reception signal, which is received by antenna element i-j, and outputs the amplified signal to mixer 42-i-j.

Mixer 42-i-j down-converts the signal, which is output from amplifier 41-i-j, into a baseband, and outputs the down-converted signal to weighting unit 43-i-j.

Each of weighting units 43-1-1 to 43-4-4 divides a multiplexed signal into signal components of the respective OAM propagation modes by applying weighting with respect to the directivity control and weighting according to the OAM propagation modes with respect to each of the signals which are output from relevant mixers 42-1-1 to 42-4-4. Furthermore, weighting units 43-1-1 to 43-4-4 output the signal components of the respective OAM propagation modes to relevant demodulators 44-1 to 44-4. Weighting units 43-1-1 to 43-4-4 have the same configuration. Hereinafter, the configuration of weighting unit 43-1-1 will be described.

Weighting unit 43-1-1 includes OAM phase shift weighting units 45-1-1-1, 45-2-1-1, 45-3-1-1, and 45-4-1-1, directivity control phase shift weighting units 46-1-1-1, 46-2-1-1, 46-3-1-1, and 46-4-1-1, and complex amplitude weighting units 47-1-1-1, 47-2-1-1, 47-3-1-1, and 47-4-1-1.

OAM phase shift weighting unit 45-1-1-1, directivity control phase shift weighting unit 46-1-1-1, and complex amplitude weighting unit 47-1-1-1 correspond to the 0-order OAM propagation mode. In the same manner, OAM phase shift weighting unit 45-2-1-1, directivity control phase shift weighting unit 46-2-1-1, and complex amplitude weighting unit 47-2-1-1 correspond to the +1-order OAM propagation mode, OAM phase shift weighting unit 45-3-1-1, directivity control phase shift weighting unit 46-3-1-1, and complex amplitude weighting unit 47-3-1-1 correspond to −1-order OAM propagation mode, and OAM phase shift weighting unit 45-4-1-1, directivity control phase shift weighting unit 46-4-1-1, and complex amplitude weighting unit 47-4-1-1 correspond to 2-order OAM propagation mode.

OAM phase shift weighting unit 45-1-1-1 applies weighting by multiplying the signal, which is output from mixer 42-1-1, by a weighting coefficient of OAM phase shift $-\phi(0, 1, 1)$, which is acquired by inverting positive and negative parts of OAM phase shift $\phi(0, 1, 1)$ in OAM phase shift weighting unit 27-1-1 of transmitter 12. In the same manner, OAM phase shift weighting unit 45-2-1-1 applies weighting by multiplying the signal, which is output from mixer 42-1-1, by a weighting coefficient of OAM phase shift $-\phi(+1, 1, 1)$. OAM phase shift weighting unit 45-3-1-1 applies weighting by multiplying the signal, which is output from mixer 42-1-1, by a weighting coefficient of OAM phase shift $-\phi(-1, 1, 1)$. OAM phase shift weighting unit 45-4-1-1 applies weighting by multiplying the signal, which is output from mixer 42-1-1, by a weighting coefficient of OAM phase shift $-\phi(2, 1, 1)$.

Directivity control phase shift weighting unit 46-1-1-1 applies weighting by multiplying the signal, which is output from OAM phase shift weighting unit 45-1-1-1, by a weighting coefficient of directivity control phase shift T'(0, 1, 1). In the same manner, directivity control phase shift weighting unit 46-2-1-1 applies weighting by multiplying a signal, which is output from OAM phase shift weighting unit 45-2-1-1, by a weighting coefficient of directivity control phase shift T'(+1, 1, 1). Directivity control phase shift weighting unit 46-3-1-1 applies weighting by multiplying a signal, which is output from OAM phase shift weighting unit 45-3-1-1, by a weighting coefficient of directivity control phase shift T'(−1, 1, 1). Directivity control phase shift weighting unit 46-4-1-1 applies weighting by multiplying a signal, which is output from OAM phase shift weighting unit 45-4-1-1, by a weighting coefficient of directivity control phase shift T'(2, 1, 1).

Complex amplitude weighting unit 47-1-1-1 generates a reception signal component r(0) of the 0-order OAM propagation mode by multiplying a signal, which is output from directivity control phase shift weighting unit 46-1-1-1, by a weighting coefficient of complex amplitude A'(0, 1, 1). Furthermore, complex amplitude weighting unit 47-1-1-1 outputs r(0) to demodulator 44-1. Complex amplitude A'(n, i, j) indicates complex amplitude of the directivity control with respect to a reception signal of the n-order OAM propagation mode in antenna element i-j.

In the same manner, complex amplitude weighting unit 47-2-1-1 generates reception signal component r(+1) of the +1-order OAM propagation mode by multiplying a signal, which is output from directivity control phase shift weighting unit 46-2-1-1, by a weighting coefficient of complex amplitude A'(+1, 1, 1). Furthermore, complex amplitude weighting unit 47-2-1-1 outputs r(+1) to demodulator 44-2. Complex amplitude weighting unit 47-3-1-1 generates reception signal component r(−1) of the −1-order OAM propagation mode by multiplying a signal, which is output from directivity control phase shift weighting unit 46-3-1-1, by a weighting coefficient of complex amplitude A'(−1, 1, 1). Furthermore, complex amplitude weighting unit 47-3-1-1 outputs r(−1) to demodulator 44-3. Complex amplitude weighting unit 47-4-1-1 generates reception signal component r(2) of the 2-order OAM propagation mode by multiplying a signal, which is output from directivity control phase shift weighting unit 46-4-1-1, by a weighting coefficient of complex amplitude A'(2, 1, 1). Furthermore, complex amplitude weighting unit 47-4-1-1 outputs r(2) to demodulator 44-4.

Complex amplitude A'(n, i, j) and directivity control phase shift T'(n, i, j) are determined based on the directivity direction of array antenna 100 and the antenna element interval. Since a method for calculating complex amplitude A'(n, i, j) and directivity control phase shift T'(n, i, j) in array antenna 100, in which the antenna elements are disposed in a lattice, is a well-known technology, the description thereof is omitted.

The same process as in weighting unit 22-1-1 is also performed in each weighting unit **43-*i-j***.

In a case where the signal which is received by antenna element i-j is set to R'(i, j), reception signal component r(n), which is output from weighting unit **43-*i-j***, of the n-order OAM propagation mode is expressed in the following Equation (2).

$$r(n) = R'(i,j) \cdot A'(n,i,j) \cdot \exp\{J(T'(n,i,j) - \Phi(n,i,j))\} \quad (2)$$

Where, J indicates an imaginary unit.

Demodulator 44-1 performs composition and demodulation processes on reception signal components r(0), which are respectively output from weighting units 43-1-1 to 43-4-4, of the 0-order OAM propagation mode. Demodulator 44-2 performs the composition and demodulation processes on reception signal components r(+1), which are respectively output from weighting units 43-1-1 to 43-4-4, of the +1-order OAM propagation mode. Demodulator 44-2 performs the composition and demodulation processes on reception signal components r(−1), which are respectively output from weighting units 43-1-1 to 43-4-4, of the −1-order OAM propagation mode. Demodulator 44-4 performs the composition and demodulation processes on reception signal components r(2), which are respectively output from weighting units 43-1-1 to 43-4-4, of the 2-order OAM propagation mode. Detailed configurations of demodulators 44-1 to 44-4 will be described using demodulator 44-1 as an example with reference to FIG. 5.

Figure 5:
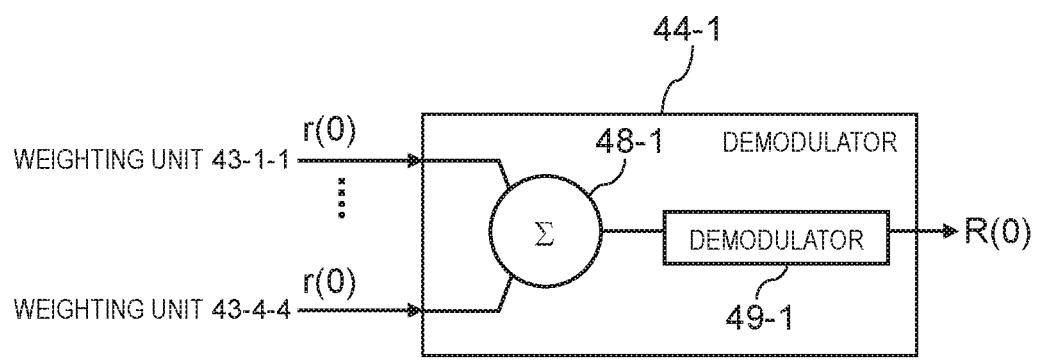
FIG. 5 is a diagram illustrating an example of a configuration of a demodulator according to the exemplary embodiment of the present disclosure.

FIG. 5 is a diagram illustrating an example of the configuration of demodulator 44-1 according to the exemplary embodiment. Demodulator 44-1 includes compositor 48-1 and demodulator 49-1.

Compositor 48-1 performs composition by adding reception signal components r(0), which are output from weighting units 43-1-1 to 43-4-4, of the 0-order OAM propagation mode. Furthermore, compositor 48-1 outputs a composed signal to demodulator 49-1.

Demodulator 49-1 performs the demodulation process on the composed signal. Demodulator 49-1 outputs signal R(0), on which the demodulation process is performed, to multiplexer 15.

Figure 6A:
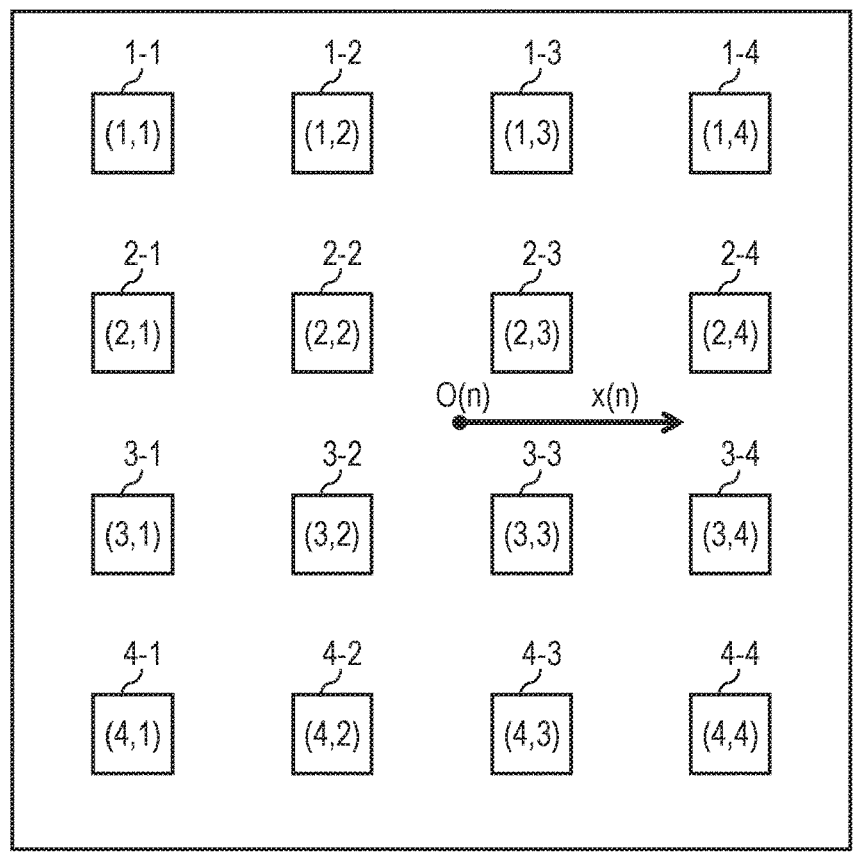
FIG. 6A is a diagram illustrating an example of a method for determining an OAM phase shift in the exemplary embodiment of the present disclosure.
Figure 6B:
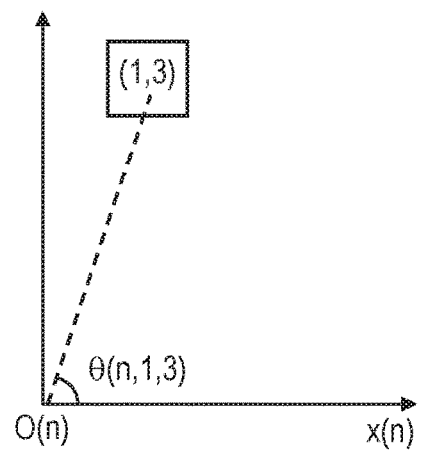
FIG. 6B is a graph illustrating an example of the method for determining the OAM phase shift in the exemplary embodiment of the present disclosure.

Subsequently, a method for determining OAM phase shift φ will be described with reference to FIG. 6A and FIG. 6B. FIG. 6A and FIG. 6B are diagrams illustrating an example of the method for determining the OAM phase shift in the exemplary embodiment. FIG. 6A illustrates central phase shift point O(n) of the n-order OAM propagation mode and reference phase shift direction x(n) of the n-order OAM propagation mode on array antenna 100 illustrated in FIG. 2.

Central phase shift point O(n) is a reference point which becomes reference used to determine the OAM phase shift. Reference phase shift direction x(n) is a reference axis which becomes reference used to determine the OAM phase shift. Reference phase shift direction x(n) is a segment which extends in a predetermined direction while central phase shift point O(n) is used as a start point. Meanwhile, a position of central phase shift point O(n) and/or an extension direction of reference phase shift direction x(n) may be different according to the OAM propagation mode.

OAM phase shift φ(n, i, j) of the n-order OAM propagation mode is calculated based on order n of the OAM propagation mode and the position of antenna element i-j.

Specifically, first, a rotation angle θ(n, i, j) of antenna element i-j is calculated based on central phase shift point O(n) and reference phase shift direction x(n). More specifically, an angle made by a straight line, which connects central phase shift point O(n) to a center of antenna element i-j, and reference phase shift direction x(n) is determined as rotation angle θ(n, i, j) of antenna element i-j.

FIG. 6B illustrates an example of rotation angle θ(n, 1, 3) of the n-order OAM propagation mode in antenna element 1-3. As illustrated in FIG. 6B, θ(n, 1, 3) is determined as an angle made by a straight line, which connects central phase shift point O(n) to a center of antenna element 1-3, and reference phase shift direction x(n).

Furthermore, in a case where rotation angle θ(n, i, j) is multiplied by n indicative of the degree, it is determined that OAM phase shift φ(n, i, j)=n×θ(n, i, j).

Subsequently, a detailed value of OAM phase shift φ will be described using 2×2 array antenna 500 disposed in square as an example. FIG. 7A is a diagram illustrating an example of the configuration of 2×2 array antenna 500 disposed in square. FIG. 7B is a diagram illustrating the OAM phase shift in 2×2 array antenna 500 disposed in square.

As illustrated in FIG. 7A, in array antenna 500, four antenna elements 1-1, 1-2, 2-1, and 2-2 are disposed in such a way that two antenna elements are disposed in a horizontal direction and two antenna elements are disposed in a vertical direction. In addition, as illustrated in FIG. 7A, a center of array antenna 500 is set to central phase shift point O(n) and a direction from central phase shift point O(n) to a center of antenna element 1-1 is set to reference phase shift direction x(n). Meanwhile, in FIG. 7A and FIG. 7B, the central phase shift point and the reference phase shift direction are common in respective degrees of the plurality of OAM propagation modes, and will be described as O(n) and x(n), respectively.

FIG. 7B illustrates OAM phase shifts of the respective antenna elements in array antenna 500 for respective OAM propagation modes.

In a case of the 0-order OAM propagation mode (n=0), all the OAM phase shifts of the respective antenna elements are 0, that is, a phase difference is not given to each other. Therefore, array antenna 500 outputs a plane wave of the same phase shift.

Subsequently, the OAM phase shift in a case of the +1-order OAM propagation mode (n=+1) will be described. The angle, which is made by reference phase shift direction x(n) and the straight line that connects the central phase shift point O(n) to a center of antenna element 2-1, is $\pi/2$. Therefore, OAM phase shift $\phi(+1, 2, 1)$ of the +1-order OAM propagation mode in antenna element 2-1 is $\pi/2$. In the same manner, OAM phase shift $\phi(+1, 2, 2)$ of the +1-order OAM propagation mode in antenna element 2-2, OAM phase shift $\phi(+1, 1, 2)$ of the +1-order OAM propagation mode in antenna element 1-2, and OAM phase shift $\phi(+1, 1, 1)$ of the +1-order OAM propagation mode in antenna element 1-1 are $\pi$, $3\pi/2$, and 0, respectively.

That is, as illustrated in FIG. 7B, in a case where the OAM phase shift of the +1-order OAM propagation mode in array antenna 500 goes one round in a clockwise direction from antenna element 1-1 centering on the central phase shift point, a phase changes by $2\pi$. Furthermore, in a case of being seen from antenna element 1-1 to left rotation, the phase increases by $\pi/2$ for each antenna element.

Subsequently, the OAM phase shift in a case of the −1-order OAM propagation mode (n=−1) will be described. As described above, an angle (rotation angle), which is made by reference phase shift direction x(n) and the straight line that connects the central phase shift point O(n) to a center of antenna element 2-1, is $\pi/2$. In the case of the −1-order OAM propagation mode, the OAM phase shift is calculated by multiplying the rotation angle by −1 which is a value of order n. That is, OAM phase shift $\phi(-1, 2, 1)$ of the −1-order OAM propagation mode in antenna element 2-1 is $-\phi/2$. In the same manner, OAM phase shift $\phi(-1, 2, 2)$ of the −1-order OAM propagation mode in antenna element 2-2, OAM phase shift $\phi(-1, 1, 2)$ of the −1-order OAM propagation mode in antenna element 1-2, and OAM phase shift $\phi(-1, 1, 1)$ of the −1-order OAM propagation mode in antenna element 1-1 are $-\pi$, $-3\pi/2$, and 0, respectively.

That is, as illustrated in FIG. 7B, in a case where the OAM phase shift of the −1-order OAM propagation mode in array antenna 500 goes one round in a clockwise direction from antenna element 1-1 centering on the central phase shift point, a phase changes by $2\pi$. Furthermore, in a case of being viewed from antenna element 1-1 in the clockwise direction, the phase increases by $\pi/2$ for every antenna element.

Subsequently, the OAM phase shift in a case of the 2-order OAM propagation mode (n=2) will be described. As described above, an angle (rotation angle), which is made by reference phase shift direction x(n) and the straight line that connects the central phase shift point O(n) to the center of antenna element 2-1, is $\pi/2$. In the case of the 2-order OAM propagation mode, the OAM phase shift is calculated by multiplying the rotation angle by 2 which is a value of order n. That is, OAM phase shift (2, 2, 1) of the 2-order OAM propagation mode in antenna element 2-1 is $\pi$. In the same manner, OAM phase shift $\phi(2, 2, 2)$ of the 2-order OAM propagation mode in antenna element 2-2, OAM phase shift $\phi(2, 1, 2)$ of the 2-order OAM propagation mode in antenna element 1-2, and OAM phase shift $\phi(2, 1, 1)$ of the 2-order OAM propagation mode in antenna element 1-1 are $2\pi$, $3\pi$, and 0, respectively.

Meanwhile, a case of applying weighting of an OAM phase shift of $2\pi$ is equal to a case of not applying weighting (that is, the OAM phase shift is 0). In addition, a case of applying weighting of an OAM phase shift of $3\pi$ is equal to a case of applying weighting of an OAM phase shift of $\pi$. Therefore, in FIG. 7B, OAM phase shift $\phi(2, 2, 2)$ and OAM phase shift $\phi(2, 1, 2)$ are illustrated as 0 and $\pi$, respectively.

That is, as illustrated in FIG. 7B, in a case where the OAM phase shift of the 2-order OAM propagation mode in array antenna 500 goes one round in a counterclockwise (or clockwise) direction from antenna element 1-1 centering on the central phase shift point, the phase shift changes by $4\pi$. Furthermore, in a case of being viewed from antenna element 1-1 in the counterclockwise (or clockwise), the phase increases by $\pi$ for every antenna element.

Figure 8A:
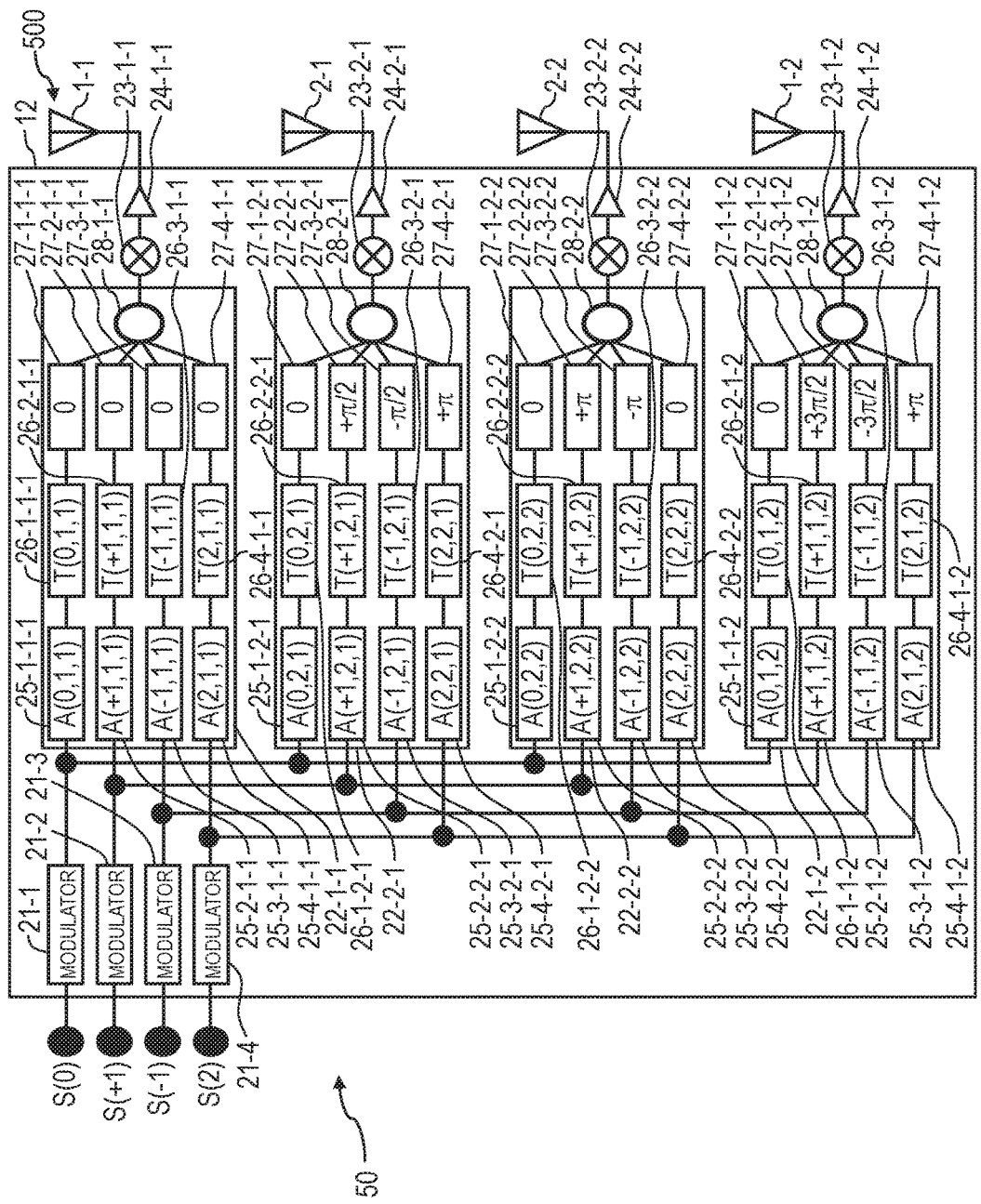
FIG. 8A is a diagram illustrating an example of the OAM multiplex transmission system in the exemplary embodiment of the present disclosure.
Figure 8B:
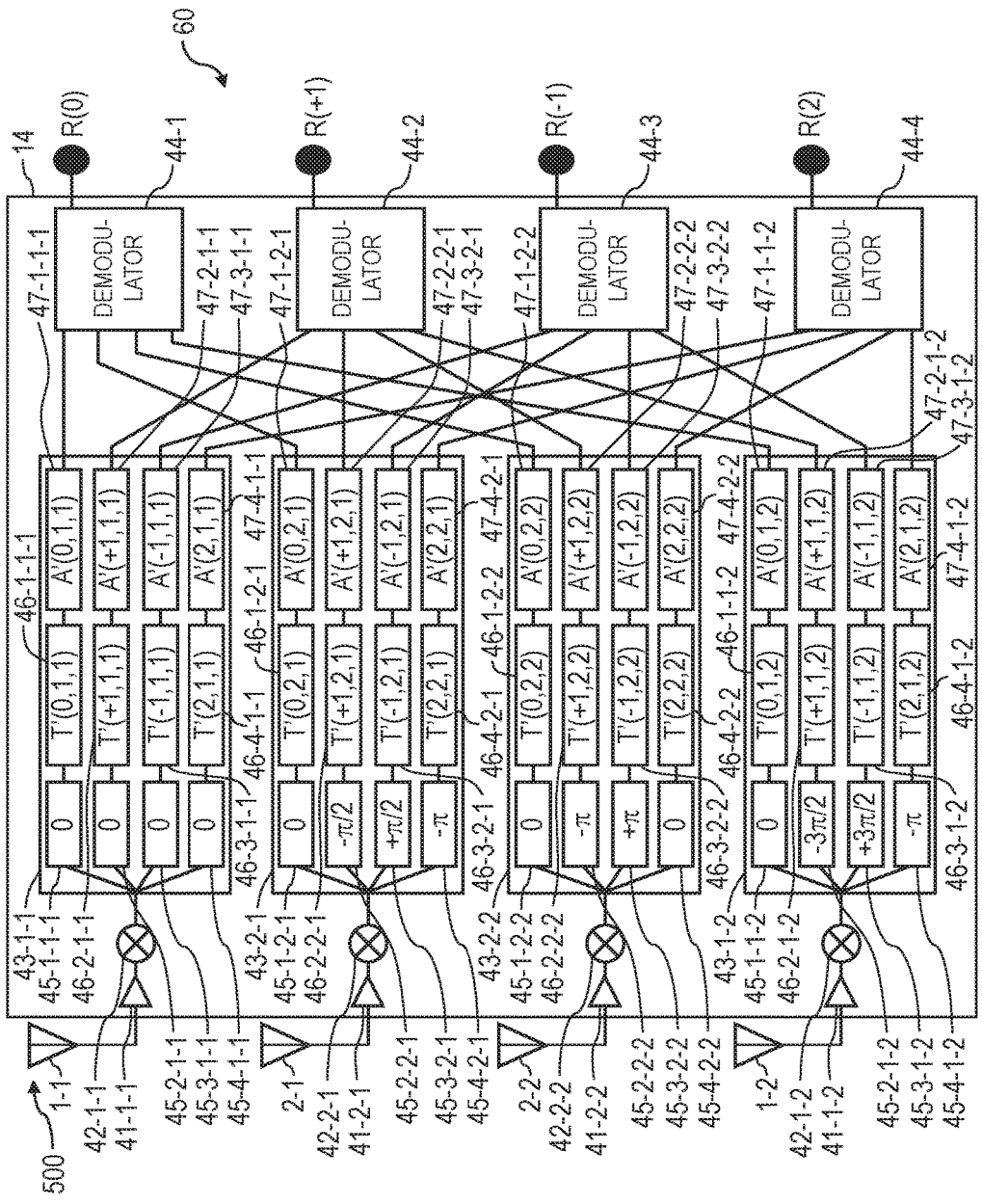
FIG. 8B is a diagram illustrating an example of the OAM multiplex transmission system in the exemplary embodiment of the present disclosure.

Subsequently, an OAM multiplex transmission system, which includes array antenna 500 illustrated in FIG. 7A and FIG. 7B, will be described. FIG. 8A and FIG. 8B are diagrams illustrating an example of the OAM multiplex transmission system according to the exemplary embodiment. Meanwhile, in FIG. 8A and FIG. 8B, the same reference symbols are attached to the same components as in the configurations illustrated in FIG. 1, FIG. 3, and FIG. 4, and the description thereof will not be repeated.

OAM multiplex transmission transceiver device 50 illustrated in FIG. 8A and OAM multiplex transmission transceiver device 60 illustrated in FIG. 8B have a configuration in which array antenna 100 of OAM multiplex transmission transceiver device 10 illustrated in FIG. 1 is replaced by array antenna 500 illustrated in FIG. 7A and FIG. 7B. For convenience of explanation, only the configuration of transmitter 12 of OAM multiplex transmission transceiver device 10 is illustrated in OAM multiplex transmission transceiver device 50. In addition, for convenience of explanation, only the configuration of receiver 14 of OAM multiplex transmission transceiver device 10 is illustrated in OAM multiplex transmission transceiver device 60.

Transmitter 12 of OAM multiplex transmission transceiver device 50 includes weighting units 22-1-1, 22-2-1, 22-2-2, and 22-1-2 according to the number of antenna elements 1-1, 2-1, 2-2, and 1-2.

OAM phase shift weighting unit 27 included in each of weighting units 22-1-1, 22-2-1, 22-2-2, and 22-1-2 applies weighting of OAM phase shift $\phi$ illustrated in FIG. 7B.

OAM phase shift weighting units 27-1-1-1, 27-1-2-1, 27-1-2-2, and 27-1-1-2, which apply weighting of the OAM phase shift of the 0-order OAM propagation mode, respectively apply weighting of OAM phase shift $\phi(1, 1, 1)=0$, $\phi(1, 2, 1)=0$, $\phi(1, 2, 2)=0$, and $\phi(1, 1, 2)=0$ of the 0-order OAM propagation mode illustrated in FIG. 7B (that is, actually, do not change the phase).

In the same manner, OAM phase shift weighting units 27-2-1-1, 27-2-2-1, 27-2-2-2, and 27-2-1-2, which apply weighting of the OAM phase shift of the +1-order OAM propagation mode, respectively apply weighting of OAM phase shift $\phi(1, 1, 1)=0$, $\phi(1, 2, 1)=\pi/2$, $\phi(1, 2, 2)=\phi$, and $\phi(1, 1, 2)=3\pi/2$ of the +1-order OAM propagation mode illustrated in FIG. 7B.

In the same manner, OAM phase shift weighting units 27-3-1-1, 27-3-2-1, 27-3-2-2, and 27-3-1-2, which apply weighting of the OAM phase shift of the −1-order OAM propagation mode, respectively apply weighting of OAM phase shift $\phi(-1, 1, 1)=0$, $\phi(-1, 2, 1)=-\pi/2$, $\phi(-1, 2, 2)=-\pi$, and $\phi(1, 1, 2)=-3\phi/2$ of the −1-order OAM propagation mode.

In the same manner, OAM phase shift weighting units 27-4-1-1, 27-4-2-1, 27-4-2-2, and 27-4-1-2, which apply weighting of the OAM phase shift of the 2-order OAM propagation mode, respectively apply weighting of OAM phase shift $\phi(2, 1, 1)=0$, $\phi(2, 2, 1)=\pi$, $\phi(2, 2, 2)=0$, and $\phi(2, 1, 2)=\phi$ of the 2-order OAM propagation mode.

Receiver 14 of OAM multiplex transmission transceiver device 60 includes weighting units 43-1-1, 43-2-1, 43-2-2, and 43-1-2 according to the number of antenna elements 1-1, 2-1, 2-2, and 1-2.

OAM phase shift weighting unit 45 included in each of weighting units 43-1-1, 43-2-1, 43-2-2, and 43-1-2 applies weighting by inverting positive and negative parts of OAM phase shift $\phi$ illustrated in FIG. 7B.

In the case of the 0-order OAM propagation mode, OAM phase shift weighting units 45-2-1-1, 45-2-2-1, 45-2-2-2, and 45-2-1-2 do not change the phase, similar to transmitter 12.

OAM phase shift weighting units 45-2-1-1, 45-2-2-1, 45-2-2-2, and 45-2-1-2, which apply weighting of the OAM phase shifts of the +1-order OAM propagation mode, respectively apply weighting $-\phi(1, 1, 1)=0$, $-\phi(1, 2, 1)=-\pi/2$, $-\phi(1, 2, 2)=-\pi$, and $-\phi(1, 1, 2)=-3\pi/2$.

In the same manner, OAM phase shift weighting units 45-3-1-1, 45-3-2-1, 45-3-2-2, and 45-3-1-2, which apply weighting of the OAM phase shifts of the −1-order OAM propagation mode, respectively apply weighting $-\phi(-1, 1, 1)=0$, $-\phi(1, 2, 1)=\pi/2$, $-\phi(-1, 2, 2)=\pi$, and $-\phi(1, 1, 2)=3\pi/2$.

In the same manner, OAM phase shift weighting units 45-4-1-1, 45-4-2-1, 45-4-2-2, and 45-4-1-2, which apply weighting of the OAM phase shifts of the 2-order OAM propagation mode, respectively apply weighting $-\phi(2, 1, 1)=0$, $-\phi(2, 2, 1)=-\pi$, $-\phi(2, 2, 2)=0$, and $-\phi(2, 1, 2)=-\pi$.

Figure 9:
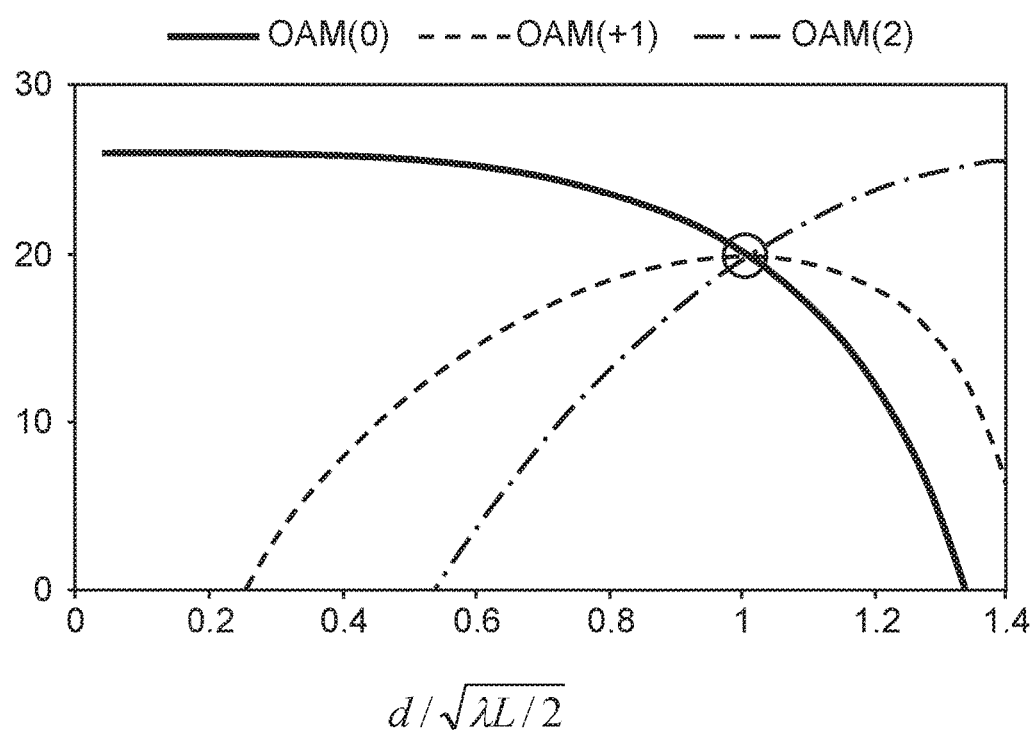
FIG. 9 is a graph illustrating a relationship between an antenna element interval and a passage property in different OAM propagation modes.

Subsequently, a relationship between the element interval of array antenna 100 and a transmission-reception distance in OAM multiplex transmission transceiver device 10 will be described. FIG. 9 is a graph illustrating relationships between the antenna element interval and a passage property in different OAM propagation modes.

A horizontal axis of FIG. 9 indicates $$D=d/\sqrt{\lambda L/2} \tag{3}$$

and a vertical axis indicates the passage property, which is expressed in a dB unit, between the OAM multiplex transmission transceiver devices. Meanwhile, d indicates the antenna element interval, $\lambda$ indicates a wavelength, and L indicates the transmission-reception distance.

As illustrated in FIG. 9, the passage property with respect to D is different according to the OAM propagation mode. Furthermore, in a case of FIG. 9, different OAM propagation modes express a substantially equal passage property in a case where D=1.

That is, in a case of FIG. 9, it is possible to assemble the passage properties of the respective OAM propagation modes in a case where OAM multiplex transmission transceiver device 10 uses the array antenna in which the antenna elements are disposed at antenna element interval d which is calculated using the following Equation (3) with respect to transmission-reception distance L and wavelength $\lambda$.

$$d=\sqrt{\lambda L/2} \tag{4}$$

In addition, it is possible to perform the OAM multiplex transmission in a case where OAM multiplex transmission transceiver device 10 selects the antenna element corresponding to antenna element interval d, in which Equation (3) is carried out, among the plurality of antenna elements included in the array antenna. With the configuration, even in a case where transmission-reception distance L changes, it is possible to assemble the passage properties of the respective OAM propagation modes.

For example, in a case of array antenna 100 illustrated in FIG. 2, OAM multiplex transmission transceiver device 10 selects any one of a square disposition of four antenna elements 1-1, 1-4, 4-1, and 4-4, a square disposition of four antenna elements 1-1, 1-3, 3-1, and 3-3, and a square disposition of four antenna elements 1-1, 1-2, 2-1, and 2-2 according to a change in transmission-reception distance L.

OAM multiplex transmission transceiver device 10 according to the above-described exemplary embodiment multiplexes and transmits the wireless signals having the OAM propagation modes by multiplying the weighting coefficients of the OAM phase shift based on an angle of each of the antenna elements with respect to a reference axis which passes through the reference point viewed from the reference point according to the OAM propagation modes and by multiplexing the weighted signals according to the respective OAM propagation modes in array antenna 100 in which the antenna elements are disposed in a lattice. With the configuration, it is possible to multiplex the signals over a plurality of orthogonal channels using the wireless signals having the plurality of OAM propagation modes, and thus it is possible to realize high communication capacity.

In addition, OAM multiplex transmission transceiver device 10 according to the exemplary embodiment uses a plurality of orthogonal channels which are realized in such a way that the different OAM propagation modes are orthogonal with each other. Therefore, a few multiplex scattering waves exist in insight environment, and it is possible to perform multiplex communication even in a situation in which it is difficult to perform the MIMO multiplex communication according to the related art. Therefore, it is possible to realize enlargement of communication capacity of a whole communication system even in the insight environment.

In addition, the exemplary embodiment has a configuration using array antenna 100 in which the antenna elements are disposed in a lattice. Therefore, for example, it is possible to use existing MIMO phased-array hardware which is used in the massive MIMO.

Meanwhile, in the exemplary embodiment, the array antenna, in which the antenna elements are disposed in square on the plane, is described. However, the present disclosure is not limited thereto. For example, the configuration of the array antenna may include a configuration, in which the antenna elements are disposed in a lattice, on a plane when viewed from the plane from predetermined direction. Furthermore, a configuration in which the antenna elements are disposed in a lattice on a cylinder may be provided.

Meanwhile, OAM multiplex transmission transceiver device 10 according to the exemplary embodiment may perform control to correct position deviation between transmission and reception.

Specifically, controller 16 of OAM multiplex transmission transceiver device 10 on a transmission side outputs a test signal to transmitter 12, and transmits the test signal to OAM multiplex transmission transceiver device 10 on a reception side via array antenna 100. Furthermore, controller 16 of OAM multiplex transmission transceiver device 10 on the reception side receives the test signal via array antenna 100 and receiver 14. Furthermore, controller 16 on the reception side estimates position deviation between transmission and reception by performing singular value decomposition on the received test signal. Controller 16 on the reception side feeds back information, which indicates the estimated position deviation to the transmission side. Furthermore, controller 16 on the transmission side and controller 16 on the reception side control the respective weighting units such that directivity is changed based on the position deviation.

Modified Example of Exemplary Embodiment

Subsequently, a configuration, in which array antenna 100 illustrated in FIG. 2 is extended and the multiplex number of the OAM propagation modes is increased, will be described as a modified example of the exemplary embodiment.

Figure 10:
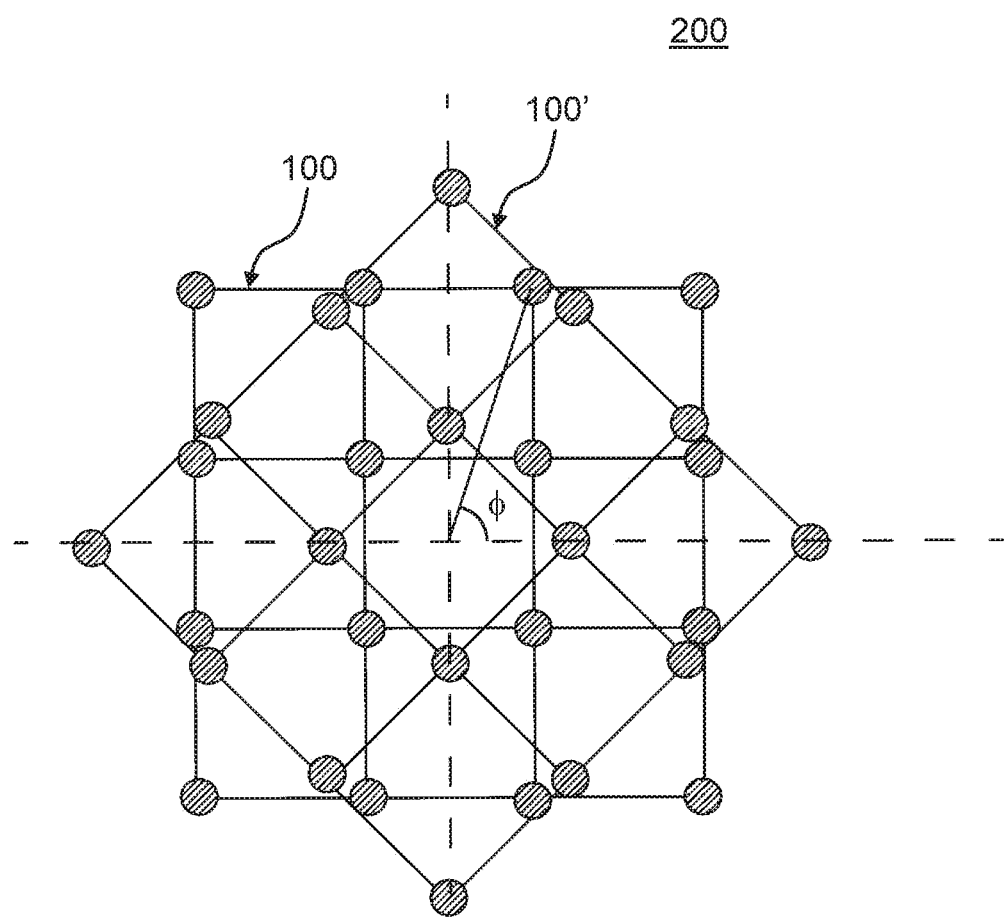
FIG. 10 is a diagram illustrating an example of a configuration of the array antenna.

FIG. 10 is a diagram illustrating an example of a configuration of array antenna 200. Array antenna 200 illustrated in FIG. 10 has a configuration in which array antenna 100 illustrated in FIG. 2 is combined with array antenna 100' in which array antenna 100 is disposed in a position which is rotated by 45°.

In a case where array antenna 100 of OAM multiplex transmission transceiver device 10 illustrated in FIG. 1 or the like is replaced by array antenna 200, it is possible to further multiplex −2-order, ±3-order, and 4-order OAM propagation modes in addition to the 0-order, +1-order, −1-order, and 2-order OAM propagation modes.

Meanwhile, in the exemplary embodiment, OAM multiplex transmission transceiver device 10, which includes array antenna 100 in which respective antenna elements are disposed on a plane, is described. However, the present disclosure is not limited thereto. Hereinafter, an application example of disposition of the array antenna will be described.

In a case where the array antenna is provided on a moving body, such as an aircraft, an antenna shape according to a shape of the moving body is preferable. An array antenna, which is suitable for a curved surface shape of the moving body, is referred to as a conformal array antenna.

Figure 11:
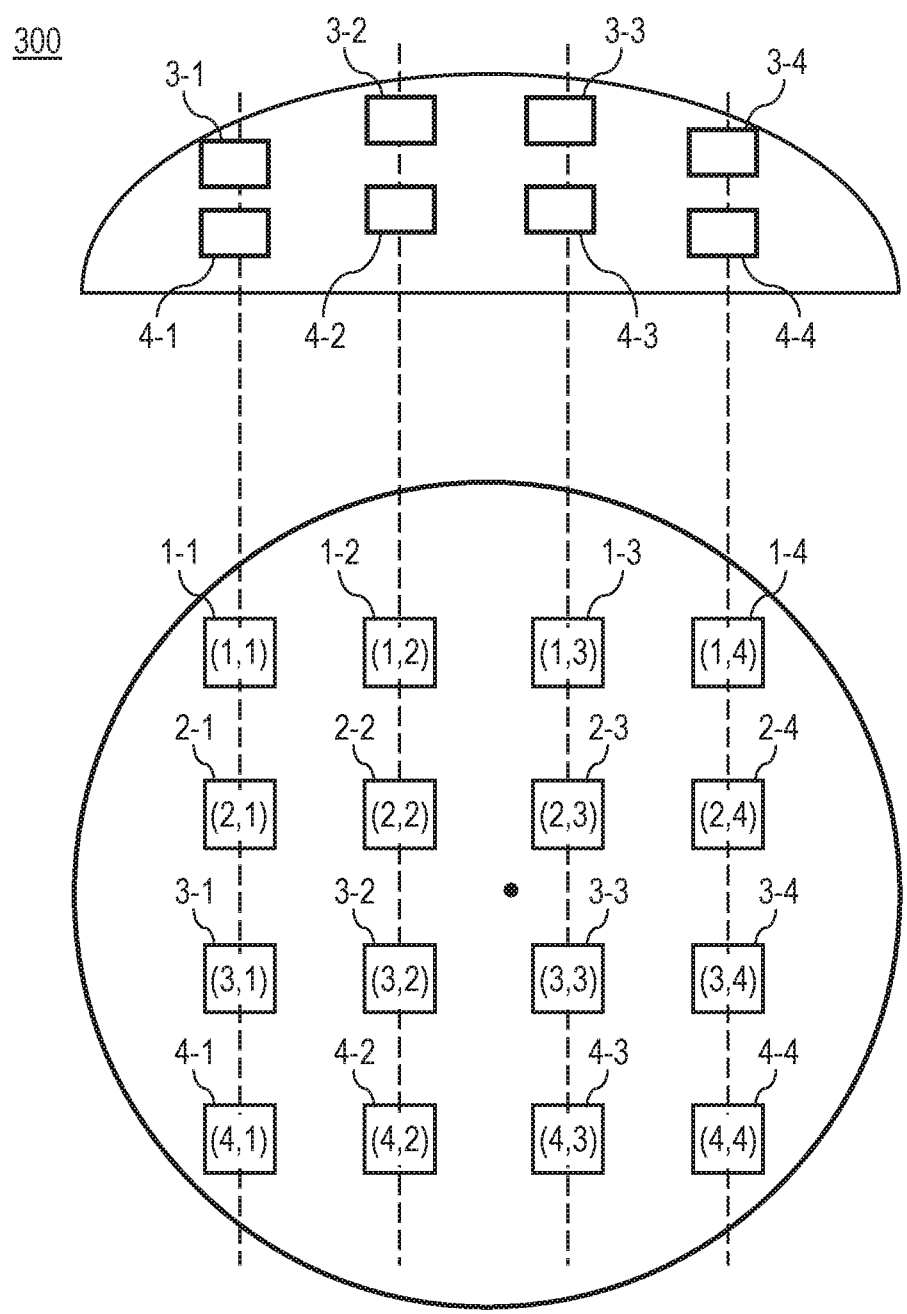
FIG. 11 is a diagram illustrating an example in which an OAM multiplex transmission transceiver device is applied to a conformal array antenna.

FIG. 11 is a diagram illustrating an example in which OAM multiplex transmission transceiver device 10 is applied to the conformal array antenna. As illustrated in FIG. 11, in conformal array antenna 300, antenna elements 1-1 to 4-4 are disposed on a curved surface of the moving body such that antenna elements 1-1 to 4-4 are disposed in square when viewed from an upper surface. With the configuration, the same advantage is acquired as in the configuration in which antenna elements 1-1 to 4-4 are disposed on the plane.

Subsequently, an example, in which 2×2 array antenna 500 that is disposed in square and that is described according to the exemplary embodiment is applied as a primary radiator in a parabola antenna or a Cassegrain antenna, will be described.

Figure 12:
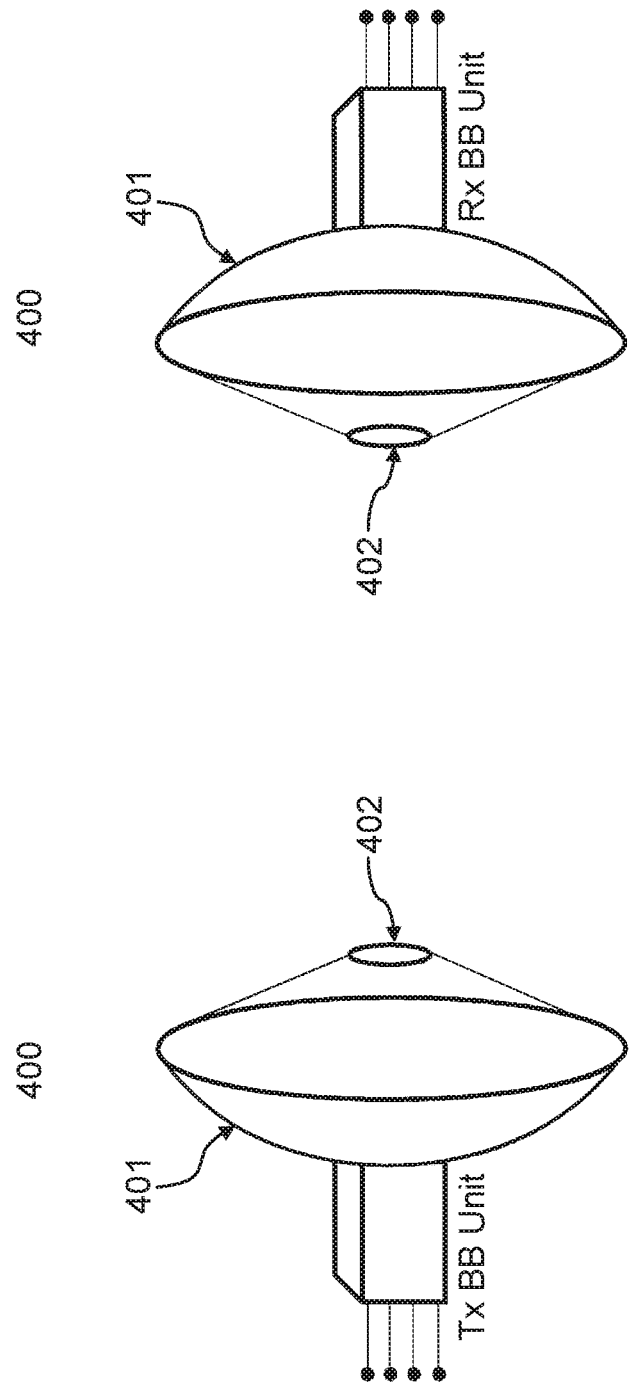
FIG. 12 is a diagram illustrating an example of a transceiving system in which the OAM multiplex transmission transceiver device is applied to a Cassegrain antenna.
Figure 13:
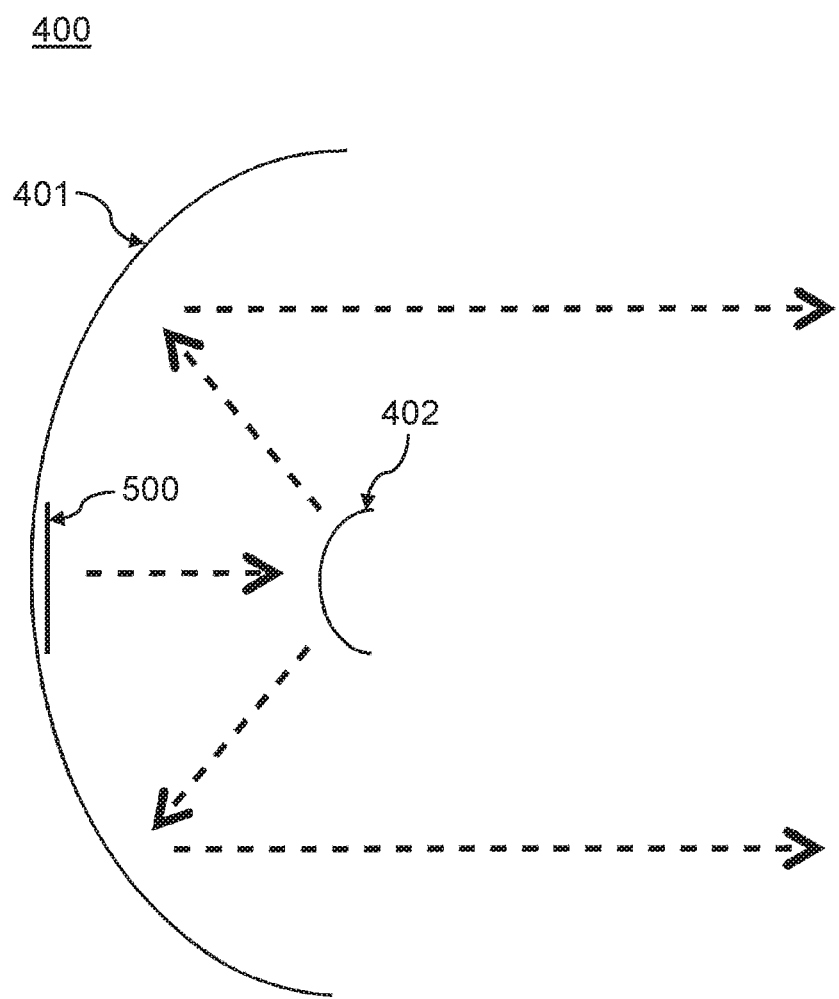
FIG. 13 is a sectional diagram illustrating an example of the Cassegrain antenna in which the array antenna in the exemplary embodiment of the present disclosure is applied as a primary radiator.

FIG. 12 is a diagram illustrating an example of a transceiving system in which OAM multiplex transmission transceiver device 10 is applied to Cassegrain antenna. FIG. 13 is a diagram illustrating an example of Cassegrain antenna 400 in which array antenna 500 according to the exemplary embodiment is applied to the primary radiator.

Cassegrain antenna 400 illustrated in FIG. 12 and FIG. 13 mostly includes main reflector 401 which has a parabolic curved surface, sub reflector 402 which has a hyperboloid, and array antenna 500.

Array antenna 500 emits electric waves in a direction of sub reflector 402 as a primary radiator. The emitted electric waves are reflected in sub reflector 402 and face a direction of main reflector 401. Furthermore, in a case where the electric waves, which face main reflector 401 from sub reflector 402, are reflected again in main reflector 401, the electric waves are assembled in a direction which is parallel to an axis direction of the parabolic curved surface of main reflector 401.

Figure 14:
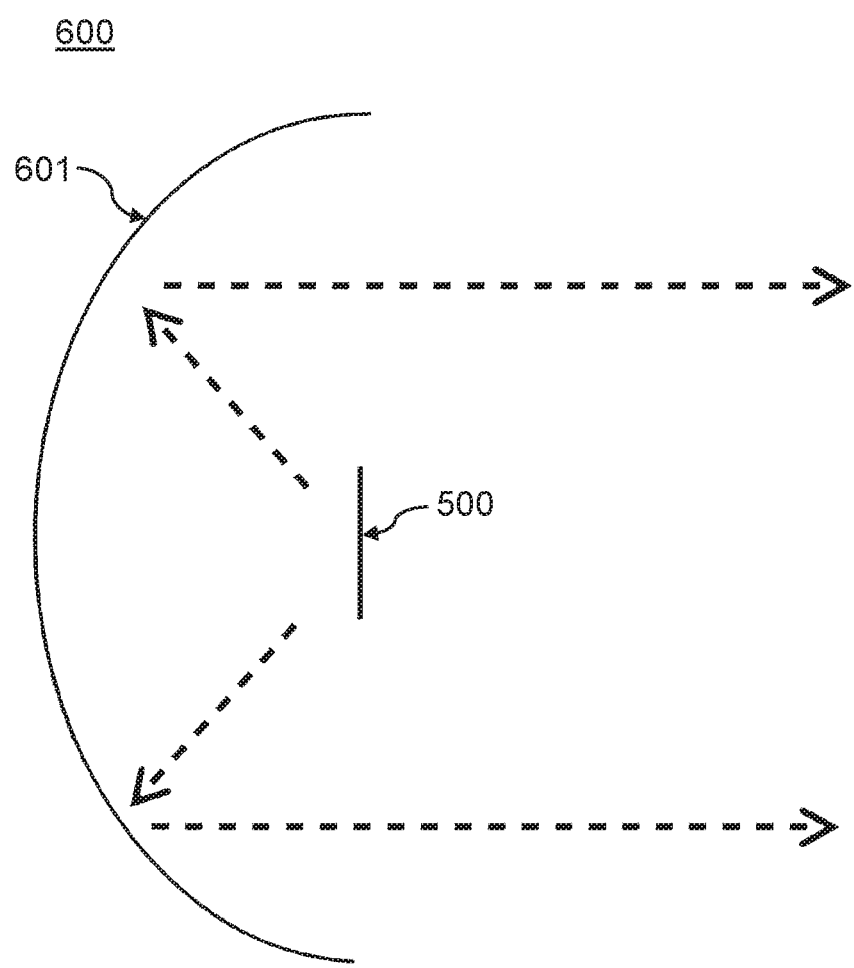
FIG. 14 is a sectional diagram illustrating an example of a parabola antenna in which the array antenna in the exemplary embodiment of the present disclosure is applied as the primary radiator.

FIG. 14 is a sectional diagram illustrating an example of the parabola antenna in which array antenna 500 according to the exemplary embodiment is applied as the primary radiator. Parabola antenna 600 illustrated in FIG. 14 includes reflector 601, which has the parabolic curved surface, and array antenna 500 at a position corresponding to a focal point of the parabolic curved surface.

Array antenna 500 emits electric waves in a direction of reflector 601 as the primary radiator. In a case where the emitted electric waves are reflected in reflector 601, the electric waves are assembled in a direction which is parallel to an axis direction of the parabolic curved surface.

In the configuration in which array antenna 500 according to the exemplary embodiment is applied as the primary radiator of Cassegrain antenna 400 or parabola antenna 600, the reflector causes expanses of spherical wave shapes of the electric waves, which are emitted from array antenna 500 and have the OAM propagation modes, to converge. Therefore, compared to the array antenna which is provided on the plane, it is possible to cause a transmission distance to be long.

In addition, in the configuration, it is possible for Cassegrain antenna 400 or parabola antenna 600 to mechanically control the directivity, electrical directivity control may not be performed in OAM multiplex transmission transceiver device 10. Meanwhile, an example in which the reflector is used is illustrated. However, for example, a configuration, in which an electric wave lens causes the electric waves to converge, may be provided.

In addition, an example in which 2×2 array antenna 500 disposed in square is applied as the primary radiator is illustrated. However, for example, transmission and reception may be performed in an OAM propagation mode using a circular array, and it is possible to cause the transmission distance to be long in the same manner.

Subsequently, a flying body tracking system, in which a flying body, such as an aircraft, includes the conformal array antenna and the Cassegrain antenna tracks the flying body from the ground will be described.

Figure 15:
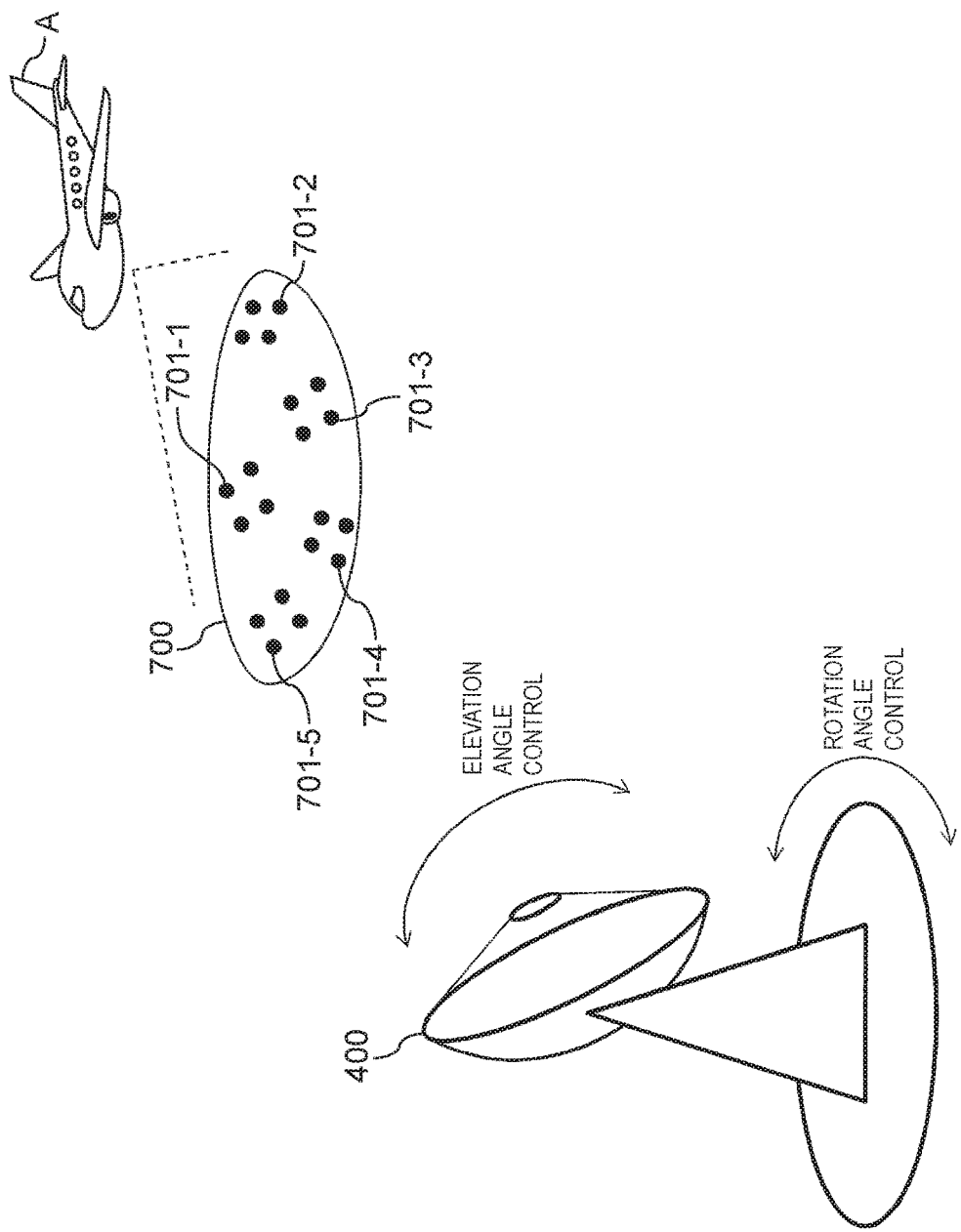
FIG. 15 is a diagram illustrating an example of a flying body tracking system.

FIG. 15 is a diagram illustrating an example of the flying body tracking system. Aircraft A includes conformal array antenna 700. Furthermore, Cassegrain antenna 400 illustrated in FIG. 12 and FIG. 13 tracks aircraft A from the ground.

Cassegrain antenna 400 tracks aircraft A by mechanically performing the directivity control, such as a change in a rotation angle and a change in an elevation angle, with respect to a horizontal plane. Specifically, Cassegrain antenna 400 performs transmission and reception of the signals, which have the OAM propagation modes, with respect to conformal array antenna 700 while performing mechanical directivity control, thereby grasping a position of aircraft A.

Conformal antenna 700 includes plurality of OAM multiple antenna sub arrays 701-1 to 701-5. Conformal array antenna 700 performs transmission and reception of the signals, which have the OAM propagation modes, while switching between OAM multiple antenna sub arrays 701-1 to 701-5. Specifically, conformal array antenna 700 will be described with reference to FIG. 16.

Figure 16:
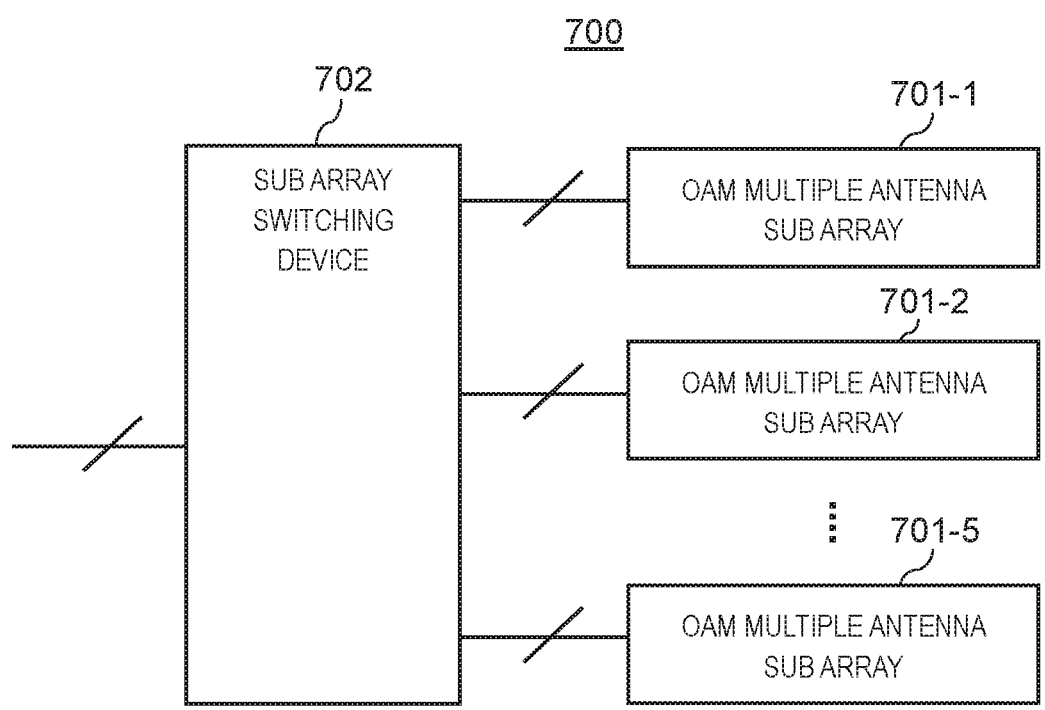
FIG. 16 is a diagram illustrating an example of a configuration of the conformal array antenna.

FIG. 16 is a block diagram illustrating an example of a configuration of conformal array antenna 700. OAM multiple antenna sub arrays 701-1 to 701-5 are the same as array antenna 100 of OAM multiplex transmission transceiver device 10 illustrated in FIG. 1 or the like. OAM multiple antenna sub arrays 701-1 to 701-5 perform directivity control in ranges, which are different from each other, through signal processing. Sub array switching device 702 performs switching after selecting best OAM multiple antenna sub arrays 701-1 to 701-5 for tracking Cassegrain antenna 400 based on control information, which is received from Cassegrain antenna 400, or the like.

In the configurations illustrated in FIG. 15 and FIG. 16, the Cassegrain antenna mechanically performs the directivity control on a ground side, and, in contrast, directivity control, in which the directivity control through the signal processing is combined with sub array switching, is performed on an aircraft side. Therefore, it is possible to further effectively track the aircraft.

In addition, in the exemplary embodiment, a case in which the present disclosure includes hardware is described as an example. However, it is possible to realize the present disclosure using software in cooperation with the hardware.

In addition, the respective functional blocks which are used for the description of the respective exemplary embodiments are typically realized as an LSI which is an integrated circuit. The functional blocks may be individually realized by one chip or may be realized by one chip so as to include a part or an entity thereof. Here, although the LSI is described, there is a case of being referred to as an IC, a system LSI, a super LSI, or an ultra LSI due to difference in a degree of integration.

In addition, an integrated circuit method is not limited to the LSI, and may be realized using a dedicated circuit or a general-purpose processor. Field Programmable Gate Array (FPGA), in which it is possible to perform programming after manufacturing the LSI, or a reconfigurable processor, in which it is possible to reconfigure connection or setting of circuit cells in the LSI, may be used.

Furthermore, in a case where a technology for integrated circuits, which are replaced by the LSI due to progress of a semiconductor technology or another deriving technology, appears, it is apparent that the functional blocks may be integrated using the technology. Application of a biotechnology or the like may be performed as possibility.

INDUSTRIAL APPLICABILITY

The present disclosure is useful for a wireless communication apparatus which multiplexes signals.

REFERENCE MARKS IN THE DRAWINGS

1-1 to 4-4 ANTENNA ELEMENT
10, 10-1, 10-2, 50, 60 OAM MULTIPLEX TRANSMISSION TRANSCEIVER DEVICE
11 DEMULTIPLEXER
12 TRANSMITTER
13 DUPLEXER
14 RECEIVER
15 MULTIPLEXER
16 CONTROLLER
21 MODULATOR
22, 43 WEIGHTING UNIT
23, 42 MIXER
24, 41 AMPLIFIER
25, 47 COMPLEX AMPLITUDE WEIGHTING UNIT
26, 46 DIRECTIVITY CONTROL PHASE SHIFT WEIGHTING UNIT
27, 45 OAM PHASE SHIFT WEIGHTING UNIT
28 ADDER
44 DEMODULATOR
48 COMPOSITOR
49 DEMODULATOR
100, 100', 200, 500 ARRAY ANTENNA
300, 700 CONFORMAL ARRAY ANTENNA
400 CASSEGRAIN ANTENNA
401 MAIN REFLECTOR
402 SUB REFLECTOR
600 PARABOLA ANTENNA
601 REFLECTOR
701 OAM MULTIPLE ANTENNA SUB ARRAY
702 SUB ARRAY SWITCHING DEVICE

The invention claimed is:

1. A transmission device that transmits multiplexed signals, the multiplexed signals being obtained by multiplexing signals of N systems corresponding to N Orbital Angular Momentum (OAM) propagation modes, N being an integer equal to or larger than 2, the transmission device comprising:
    an array antenna that includes M antenna elements disposed in a lattice on a plane when viewed from the plane, M being an integer equal to or larger than 2; and
    a transmitter that multiplies signals obtained by branching each of the signals of N systems into M signals by weighting coefficients of phase shift angles based on angles of the respective M antenna elements with respect to a reference axis passing through a reference point viewed from the reference point on the plane according to the OAM propagation modes, multiplexes the signals of N systems multiplied by the weighting coefficients of the phase shift angles, and transmits signals obtained by the multiplexing from the M antenna elements.

2. The transmission device of claim 1,
    wherein the transmitter includes M weighting units that are respectively connected to the M antenna elements,
    wherein each of the M weighting units includes
        N phase shift weighting units, and
        a compositor that composes signals which are output from the N phase shift weighting units,
    wherein an n-th phase shift weighting unit included in an m-th weighting unit multiplies an n-th system of signal by a weighting coefficient of a phase shift angle, the phase shift angle being determined by multiplying an angle of an m-th antenna element in an n-th OAM propagation mode by an order of the n-th OAM propagation mode, n being an integer equal to or larger than 1 and being equal to or smaller than N, m being an integer equal to or larger than 1 and being equal to or smaller than M,
    wherein the angle of the m-th antenna element in the n-th OAM propagation mode is an angle made by the reference axis extending in an n-th direction on the plane from an n-th reference point of the plane and a straight line connecting the n-th reference point to a central point of the m-th antenna element.

3. The transmission device of claim 2, wherein each of the M weighting units includes
    N complex amplitude weighting units that apply weighting of complex amplitude used to control directivity of the array antenna, with respect to each of the relevant signals of N systems, and
    N directivity control phase shift weighting units that apply weighting of phase shift used to control the directivity, with respect to each of the relevant signals of N systems.

4. The transmission device of claim 1, wherein the array antenna includes a first antenna unit disposed in a lattice, and a second antenna unit being rotated by 45 degrees on the plane with respect to the first antenna unit.

5. The transmission device of claim 1, wherein an interval between the M antenna elements is determined by a wavelength of an output signal of the transmission device and a distance between the transmission device and a reception device performing communication with the transmission device.

6. The transmission device of claim 1, wherein the transmission device selects an antenna element to be used for communication among the M antenna elements based on a wavelength of a signal output from the transmission device and a distance between the transmission device and the reception device performing communication with the transmission device.

7. The transmission device of claim 1, further comprising:
a conformal antenna in which the antenna elements are disposed on a curved surface,
wherein, in a case where the conformal antenna is viewed from a plane, the antenna elements are disposed in a lattice.

8. The transmission device of claim 1, further comprising:
a parabola antenna,
wherein the array antenna is provided as a primary radiator of the parabola antenna.

9. The transmission device of claim 1, further comprising:
a Cassegrain antenna,
wherein the array antenna is provided as a primary radiator of the Cassegrain antenna.

10. A reception device that receives multiplexed signals, the multiplexed signals being obtained by multiplexing signals of N systems corresponding to N Orbital Angular Momentum (OAM) propagation modes, N being an integer equal to or larger than 2, the reception device comprising:
an array antenna that includes M antenna elements disposed in a lattice on a plane when viewed from the plane, M being an integer equal to or larger than 2; and
a receiver that multiplies the multiplexed signals by weighting coefficients of phase shift angles based on angles of the respective M antenna elements with respect to a reference axis passing through a reference point viewed from the reference point on the plane according to the OAM propagation modes, and divides the multiplexed signals into N systems of reception signals.

11. A transmission method for transmitting multiplexed signals using an array antenna including M antenna elements disposed in a lattice on a plane when viewed from the plane, the multiplexed signals being obtained by multiplexing signals of N systems corresponding to N Orbital Angular Momentum (OAM) propagation modes, M being an integer equal to or larger than 2, N being an integer equal to or larger than 2, the transmission method comprising:
multiplying signals obtained by branching each of the signals of N systems into M signals by weighting coefficients of phase shift angles based on angles of the respective M antenna elements with respect to a reference axis passing through a reference point viewed from the reference point on the plane according to the OAM propagation modes;
multiplexing the signals of N systems multiplied by the weighting coefficients of the phase shift angles; and
transmitting signals obtained by the multiplexing from the M antenna elements.

12. A reception method for receiving multiplexed signals using an array antenna including M antenna elements disposed in a lattice on a plane when viewed from the plane, the multiplexed signals being obtained by multiplexing signals of N systems corresponding to N Orbital Angular Momentum (OAM) propagation modes, M being an integer equal to or larger than 2, N being an integer equal to or larger than 2, the reception method comprising:
receiving the multiplexed signals from the M antenna elements;
multiplying the received multiplexed signals by weighting coefficients of phase shift angles based on angles of the respective M antenna elements with respect to a reference axis passing through a reference point viewed from the reference point on the plane according to the OAM propagation modes; and
dividing the multiplexed signals into N systems of reception signals.

* * * * *